(12) United States Patent
Lehn et al.

(10) Patent No.: US 12,170,493 B2
(45) Date of Patent: Dec. 17, 2024

(54) SYSTEMS AND METHODS FOR AN ON-BOARD FAST CHARGER

(71) Applicants: THE GOVERNING COUNCIL OF THE UNIVERSITY OF TORONTO, Toronto (CA); ELEAPPOWER LTD., Toronto (CA)

(72) Inventors: Peter Lehn, Toronto (CA); Ruoyun Shi, Toronto (CA); Theodore Soong, Toronto (CA)

(73) Assignees: THE GOVERNINING COUNCI OF THE UNIVERSITY OF TORONTO, Toronto (CA); ELEAPPOWER LTD., North York (CA)

( * ) Notice: Subject to any disclaimer, the term of this patent is extended or adjusted under 35 U.S.C. 154(b) by 129 days.

(21) Appl. No.: 17/972,468

(22) Filed: Oct. 24, 2022

(65) Prior Publication Data

US 2023/0047524 A1 Feb. 16, 2023

Related U.S. Application Data

(63) Continuation of application No. 16/622,801, filed as application No. PCT/CA2018/000117 on Jun. 13, 2018, now Pat. No. 11,482,948.

(Continued)

(51) Int. Cl.
 *H02M 7/5387* (2007.01)
 *B60L 15/00* (2006.01)
 (Continued)

(52) U.S. Cl.
 CPC ......... *H02M 7/5387* (2013.01); *B60L 15/007* (2013.01); *B60L 50/50* (2019.02);
 (Continued)

(58) Field of Classification Search
 CPC .... H02M 7/5387; B60L 15/007; B60L 50/50; B60L 53/22; B60L 53/24; B60L 2210/44;
 (Continued)

(56) References Cited

U.S. PATENT DOCUMENTS

| 7,154,237 B2 * | 12/2006 | Welchko | B60L 50/51 |
| | | | 318/400.27 |
| 7,164,254 B2 * | 1/2007 | Kerkman | H02M 1/44 |
| | | | 318/803 |

(Continued)

FOREIGN PATENT DOCUMENTS

| CN | 101071954 A | 11/2007 |
| CN | 101420184 A | 4/2009 |

(Continued)

OTHER PUBLICATIONS

China National Intellectual Property Administration (CNIPA), First Office Action to CN 2018800393882, Jan. 20, 2023.

(Continued)

*Primary Examiner* — David Luo
(74) *Attorney, Agent, or Firm* — Norton Rose Fulbright Canada LLP

(57) ABSTRACT

An innovative power electronic control system suitable for various applications, such as for electric vehicles is provided. The system, in some embodiments, is configured for the purposes of on-board AC fast charging (e.g., single phase or multi-phase) when an object is not in use (e.g., a vehicle is stationary) and use as a drive (e.g., for a vehicle, an EV drivetrain) when in motion. The innovative power electronic control system enables, among others, the ability to obtain fast-charging from existing grid infrastructure.

20 Claims, 19 Drawing Sheets

Related U.S. Application Data

(60) Provisional application No. 62/518,949, filed on Jun. 13, 2017.

(51) Int. Cl.
  *B60L 50/50* (2019.01)
  *B60L 53/22* (2019.01)
  *B60L 53/24* (2019.01)
  *H02J 7/02* (2016.01)
  *H02J 15/00* (2006.01)

(52) U.S. Cl.
  CPC .............. *B60L 53/22* (2019.02); *B60L 53/24* (2019.02); *H02J 7/02* (2013.01); *H02J 15/00* (2013.01); *B60L 2210/44* (2013.01); *H02J 2207/20* (2020.01); *H02J 2310/48* (2020.01)

(58) Field of Classification Search
  CPC .. B60L 55/00; B60L 2200/10; B60L 2200/22; B60L 2200/32; B60L 2210/30; B60L 2260/22; H02J 7/02; H02J 15/00; H02J 2207/20; H02J 2310/48; Y02T 3/322; H02J 2310/40; Y02T 10/64; Y02T 10/70; Y02T 10/7072; Y02T 10/92; Y02T 90/12; Y02T 90/14; Y02T 10/72; H02P 27/06; B60Y 2200/91
  USPC ........................ 318/139, 400.26, 400.01, 700
  See application file for complete search history.

(56) References Cited

U.S. PATENT DOCUMENTS

| | | | |
|---|---|---|---|
| 7,932,633 B2 | 4/2011 | King et al. | |
| 8,698,451 B2 | 4/2014 | King | H02J 7/0029 |
| | | | 320/109 |
| 8,860,342 B2* | 10/2014 | Krefta | H02P 21/06 |
| | | | 318/400.32 |
| 9,054,599 B2* | 6/2015 | Wei | H02M 7/493 |
| 9,290,097 B2 | 3/2016 | Steigerwald | B60L 3/0069 |
| 9,620,974 B2 | 4/2017 | King et al. | |
| 9,800,182 B2 | 10/2017 | Zhou | B60L 58/20 |
| 9,931,939 B2 | 4/2018 | Alakula | B60L 3/0069 |
| 10,439,541 B2 | 10/2019 | Findeisen | B60L 50/51 |
| 11,097,624 B2 | 8/2021 | Kobayashi | H02M 7/04 |
| 11,167,654 B2 | 11/2021 | King | B60L 53/20 |
| 2003/0034755 A1 | 2/2003 | Krefta | H02P 6/15 |
| | | | 318/801 |
| 2005/0231152 A1 | 10/2005 | Welchko | B60L 53/14 |
| | | | 318/801 |
| 2006/0164027 A1 | 7/2006 | Welchko | H02P 27/06 |
| | | | 318/105 |
| 2010/0096926 A1 | 4/2010 | King | B60L 50/16 |
| | | | 307/45 |
| 2011/0041723 A1 | 2/2011 | Kumar | B60L 15/2045 |
| | | | 105/35 |
| 2014/0265942 A1 | 9/2014 | Li | H02P 5/74 |
| | | | 318/51 |
| 2016/0152146 A1 | 6/2016 | Adra et al. | |
| 2017/0001528 A1 | 1/2017 | King et al. | |
| 2019/0126760 A1 | 5/2019 | Najmabadi | B60L 53/12 |

FOREIGN PATENT DOCUMENTS

| | | |
|---|---|---|
| CN | 105490510 A | 4/2016 |
| EP | 1494343 A2 | 1/2005 |
| JP | 2006211891 A | 8/2006 |
| JP | 2008219956 A | 9/2008 |

OTHER PUBLICATIONS

1 Office Action issued in corresponding Japanese Application No. 2020-519161, mailed Sep. 14, 2021.

Supplemental European Search Report issued in European Application No. EP 18816785, dated Jan. 28, 2021.

Ruoyun S. etal., "Modified Dual Inverter Drive Enabling On-Board Fast Charging of Electric Vehicles", IECON 2016—42nd Annual Conference of the IEEE Industrial Electronics Society, Oct. 23, 2016, p. 4435-4440.

Canadian Intellectual Property Office, International Search Report and Written Opinion for PCT/CA2018/000117, Sep. 10, 2018.

Korean Patent Office (KIPO), Notification of Reason for Refusal dated Oct. 12, 2021 issued to KR Application No. 10-2020-7001080.

Intellectual Property India, First Examination Report dated Sep. 10, 2021 issued to IN Application No. 202027001051.

* cited by examiner

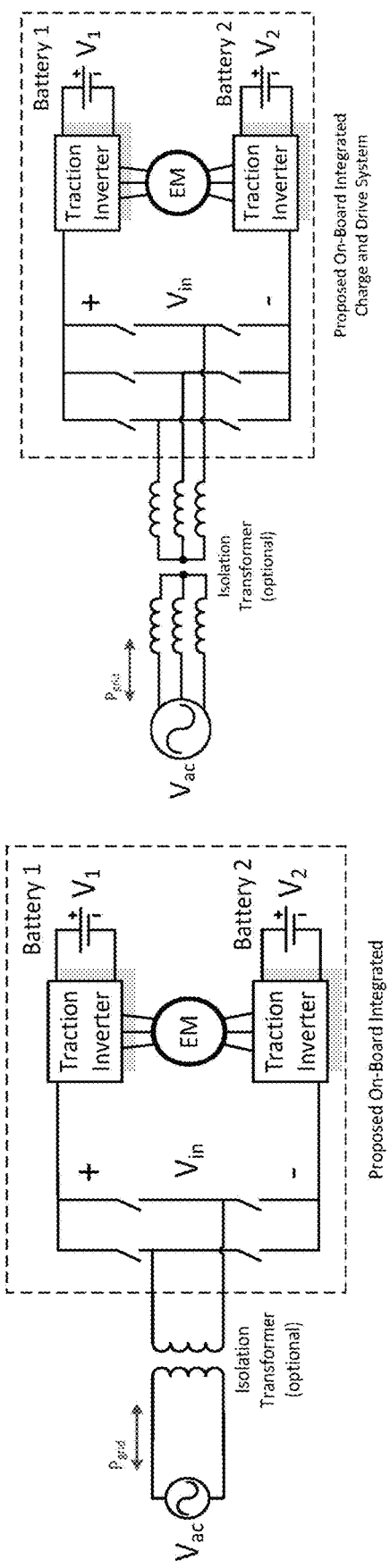
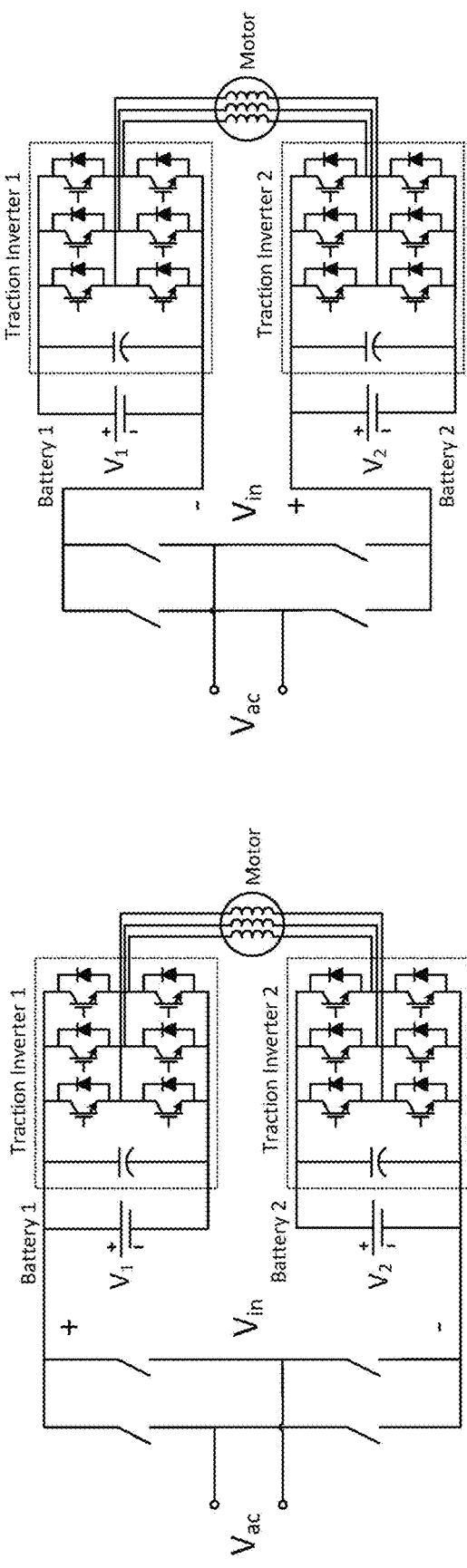
FIG. 2A
FIG. 2B
FIG. 2C
FIG. 2D

SYSTEMS AND METHODS FOR AN ON-BOARD FAST CHARGER

CROSS REFERENCE

This application is a Continuation of U.S. application Ser. No. 16/622,801 filed on Dec. 13, 2019, which is a United States 371 National Stage Application of PCT Application No. PCT/CA2018/000117 filed on Jun. 13, 2018, which is a non-provisional of, and claims all benefit, including priority to, U.S. Application No. 62/518,949, dated 2017 Jun. 13, entitled "SYSTEMS AND METHODS FOR AN ON-BOARD FAST CHARGER", incorporated herein by reference.

FIELD

The present disclosure generally relates to the field of power electronics, and more particularly, improved charging mechanisms for applications where portability and weight are considerations.

INTRODUCTION

A challenge with delivering power and charge capabilities is that, from a structural perspective, the components may be heavy, bulky, and expensive. For example, in relation to electric vehicles, charging stations may be used to transfer power from a power source to an on-board battery of the electric vehicle.

There can be different levels of power delivery, where various power tiers (e.g., volts and amperes) are provided for charging. A low level of charging, for example, can be provided by way of a direct plug into a wall socket, but the charging is slow (e.g., overnight charging). The higher the charger level, the faster the charge (e.g., full charge in 45 minutes), but significant investment in infrastructure is typically required.

These fast charging stations typically include large and expensive electrical/magnetic components that are required to aid in ensuring that power delivery characteristics match the requirements of either the power source or the on-board battery.

These requirements cause a need for specialized equipment located at charging stations, potentially impeding the adoption and availability of charging. Increased availability of "fast charging" options aids in improving access to charging as higher turnover can achieved and a greater proliferation of fast chargers is possible if infrastructure requirements are reduced.

SUMMARY

An innovative power electronic control system suitable for various applications, such as for electric vehicles is provided. The system, in some embodiments, is configured for the purposes of on-board AC fast charging (e.g., single phase or multi-phase) when an object is not in use (e.g., a vehicle is stationary) and use as a drive (e.g., for a vehicle, an EV drivetrain) when in motion.

In some embodiments, when the vehicle is connected to the grid, the circuit allows bidirectional power transfer. The vehicle can send power back to the grid without additional electronics and magnetic components required to facilitate power delivery. A topology and associated controls to enable single-phase or multi-phase on-board EV fast charging have been developed and validated.

In an embodiment, when in motion, a circuit according to the topology operates as a drive, but when stationary, the circuit operates as a single-phase AC charger. Unlike competing technologies, the system re-uses the motor when the object (e.g., a vehicle) is stationary for AC fast charging. This dynamic re-deployment of the motor reduces part count, therefore reduces the weight of magnetic components required to achieve on-board AC fast charging.

The drive serves as both the motor drive and charger. When acting as a charger, the circuit is controlled to reduce low frequency harmonics, thereby reducing infrastructure requirements to a solitary cable or cable with transformer if isolation is needed, according to some embodiments. When acting as a charger, the drive converter of some embodiments reduces switching frequency harmonics through specialized modulation scheme, which fully utilizes the drive hardware. The topology integrates two energy storage sources (e.g., batteries, supercapacitors, fuel cells or a combination thereof) together and actively exchanges energy between the two storage sources.

Thus, in some embodiments, energy can be transferred from one storage source to the other to mitigate ripple energy content or balance the energy between the sources.

The topology of some examples enable the use of higher voltage motors and accommodates higher voltage AC grid voltages without utilizing a commensurately high voltage energy source. Specifically, the topology can be configured to accommodate common commercial input AC voltages including 208V commercial, 277V/480V commercial (US), 240/400V (EU) and 347V/600V commercial (Canada) when charging.

Accordingly, various embodiments enable on-board single-phase AC fast charging at all common commercial AC voltages with minimal harmonic impact to the grid. There may be various potential benefits, including, for example: (1) reducing/minimizing component count and weight by utilizing EV motor, (2) reduced harmonic impact to the grid, (3) reduced switching harmonics to the grid and motor, (4) sub-division of the energy storage system into two separate controllable units and sharing energy between the two energy storage systems, and (5) enablement higher-voltage motors and higher-voltage charging, accommodating various common commercial input voltages.

In accordance with an aspect, there is provided a device adapted to provide both drive and charging functionality, the device comprising: a first traction inverter and a first energy storage device coupled to an electric motor and to a power source; a second traction inverter and a second energy storage device coupled to the electric motor and the power source, the first traction inverter and the second traction inverter coupled to one another across the electric motor; an AC/DC converter front-end circuit interfacing the first traction inverter and the second traction inverter and the power source; and a controller circuit configured to control operating characteristics of the AC/DC converter front-end circuit, the first traction inverter, and the second traction inverter by provisioning gating signals that, when applied to one or more switching gates of the first traction inverter and the second traction inverter, shape power characteristics of power delivered to the first energy storage device and the second energy storage device from the power source.

In accordance with another aspect, the gating signals cause interleaved switching of the one or more switching gates of the first traction inverter and the second traction inverter, the interleaved switching adapted to enable continuous conduction of the first energy storage device and the second energy storage device, the first energy storage device and the second energy storage conducting current through at least one phase of conduction in a period.

In accordance with another aspect, the interleaved switching causes a most significant harmonic to be shifted to 3 fsw.

In accordance with another aspect, each of the first traction inverter and the second traction inverter include a switching network incorporating the one or more switching gates, the switching networks controlling individual currents flowing to respective ones of the first energy storage device and the second energy storage device.

In accordance with another aspect, each of the switching networks of the first traction inverter and the second traction inverter include at least six switches having a set of inner switches and a set of outer switches.

In accordance with another aspect, the gating signals control the switching networks to balance power between the first energy storage device and the second energy storage device such that the voltage across the first energy storage device and the second energy storage device match an input voltage of the power source.

In accordance with another aspect, the set of inner switches and the set of outer switches have a same percentage of on-time in a switching period.

In accordance with another aspect, the gating signals between the switching network of the first traction inverter and the switching network of the second traction inverter are phase shifted by 180 degrees.

In accordance with another aspect, the gating signals between pairs of the switches of the switching networks are phase shifted by 120 degrees.

In accordance with another aspect, switches of the AC/DC converter front-end circuit are synchronized to a grid voltage of the power source.

In accordance with another aspect, the controller circuit is further configured for bi-directional operation in which at least one of the first energy storage device and the second energy device deliver power to the power source.

In accordance with another aspect, the gating signals regulate a direction of power between at least one of the first energy storage device and the second energy device and the power source.

In accordance with another aspect, the electric motor is mounted in a vehicle and the electric motor is configured for dual-mode operation comprising a first mode wherein the electric motor provides the drive functionality to impart forces to move the vehicle, and a second mode wherein the electric motor provides the charging functionality when electrically coupled to the power source.

In accordance with another aspect, a uni-directional current conduction capable switch enables unidirectional power exchange with the power source.

In accordance with another aspect, a bi-directional current conduction capable switch enables bi-directional power exchange.

In accordance with another aspect, the controller circuit is configured to generate control signals adapted to regulate a power factor on the grid-side and to reduce a magnitude of low frequency harmonics generated when charging the vehicle from the grid.

In accordance with another aspect, the controller circuit is configured to improve the power factor and to reduce the harmonic current components generated at AC terminals of the converter thereby reducing the requirements for or eliminating an AC-side filter.

In accordance with another aspect, the power supply provides single-phase AC power.

In accordance with another aspect, the power supply provides three-phase AC power.

In accordance with another aspect, a net voltage across the first energy storage device and the second energy storage device is maintained by the controller circuit to always be greater than a peak voltage received from the power supply.

In accordance with another aspect, the first energy storage device and the second energy storage device are a same type of energy storage device.

In accordance with another aspect, the first energy storage device and the second energy storage device are different types of energy storage device.

In accordance with another aspect, the first energy storage device and the second energy storage device are both batteries.

In accordance with another aspect, the first energy storage device and the second energy storage device are both capacitors.

In accordance with another aspect, the first energy storage device and the second energy storage device include at least one capacitor and at least one battery.

In accordance with another aspect, the shaping of the power characteristics of the power delivered to the first energy storage device and the second energy storage device from the power source is adapted to reduce waveform distortions in power imposed on the power source.

In accordance with another aspect, the vehicle is at least one of an automobile, an airplane, and a ship.

Corresponding methods, vehicles, systems, and controller circuits are contemplated.

In another aspect, the methods for gating controls are provided in the form of corresponding computer readable media storing machine interpretable instructions, which when executed, cause a processor or pulse width modulator to perform a gating control method described herein to control one or more switching networks. In various further aspects, corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting. Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

In FIG. 1A, the machine's neutral points can be directly connected to a three-phase AC input, requiring no additional hardware between the AC grid and traction system.

FIG. 2A is a circuit topology illustrating a single-phase charging configuration, according to some embodiments.

FIG. 2B is a circuit topology illustrating a three-phase charging configuration, according to some embodiments.

FIG. 2C and FIG. 2D are circuit diagrams of the on-board integrated charge and drive systems, according to some embodiments.

DETAILED DESCRIPTION

Figure 1:
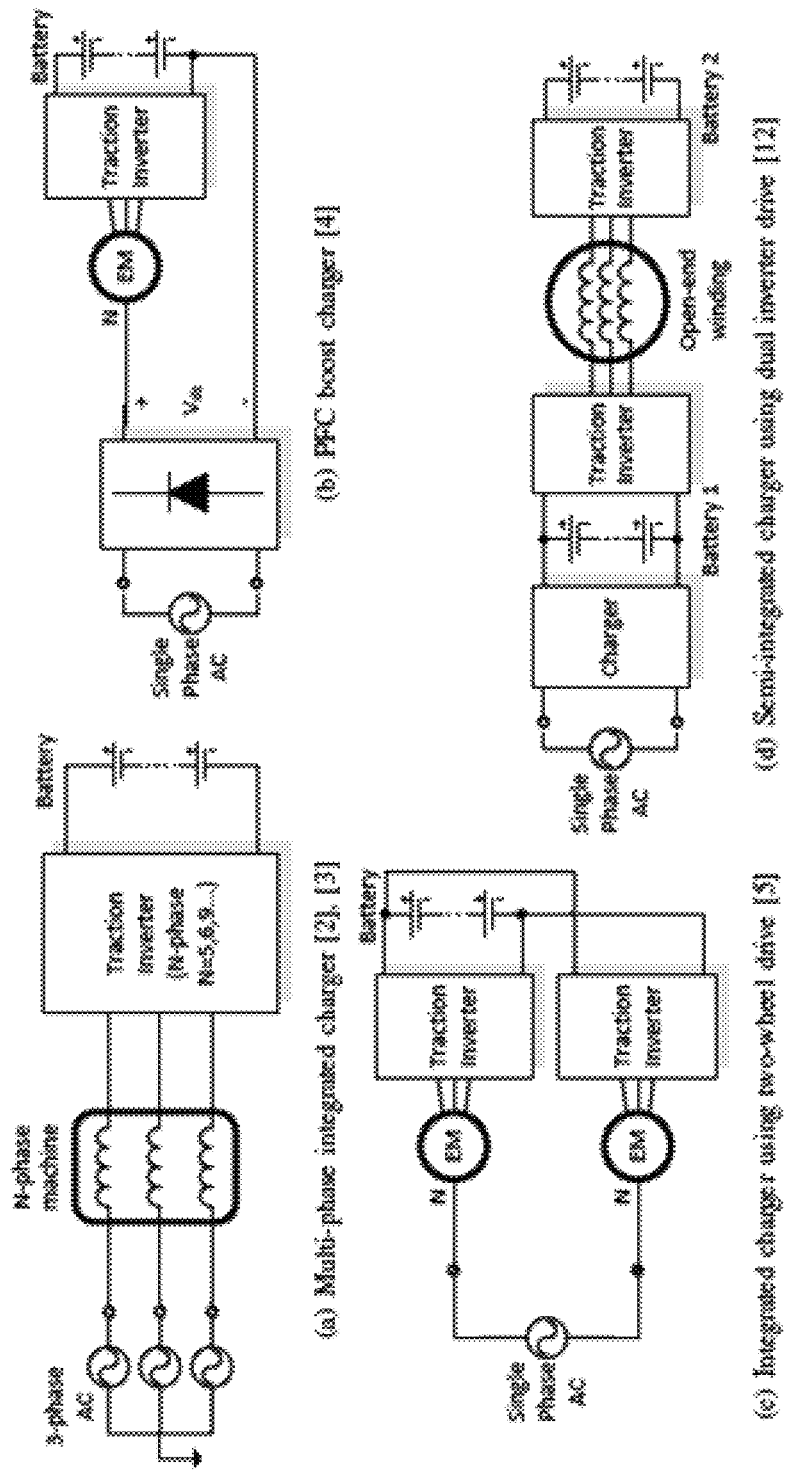
FIG. 1A illustrates an example of an integrated charger based on a 9-phase traction system.
FIG. 1B shows the topology for integrated charging via single-phase AC systems.
FIG. 1C is a illustrative of a set of parallel-connected traction inverters and two motors to charge from a single-phase AC source.
FIG. 1D is a circuit topology illustrating a single charger utilized for charging both batteries.

Embodiments of methods, systems, and apparatus are described through reference to the drawings. The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. The embodiments of the devices, systems and methods described herein may be implemented in a combination of both electronic components, computer hardware. firmware, and/or software. These embodiments may be implemented on programmable computers or electronic devices.

Electric vehicles include, for example, cars, trucks, airplanes, ships, unmanned aerial devices, among others. All of these vehicles may include electric motors that, not only provide drive characteristics, but also power on-board electronic components. These electric motors are often limited by the range of on-board energy storage (e.g., batteries), and require routine charging. Charging speed may be impacted by available infrastructure, and infrastructure improvements may be required to obtain rapid charging as, for example, electrical grids may be poorly equipped to deliver high levels of power flow.

Electrical grids, when delivering high levels of power flow, often introduce distortions in power that need to be addressed before providing to the on-board energy storage. Accordingly, the power from the source needs to have distortions removed (e.g., via power shaping), and the removal of distortions is a challenging task that requires significant magnetic components. Charging infrastructure can be provided at charging stations, or, in some cases, provided on-board the vehicle in the form of an on-board charger.

A typical on-board charger consists of a DC/DC stage and a DC/AC stage connected to the AC grid, typically along with galvanic isolation. The DC/DC stage is able to accommodate variations in battery voltage.

This on-board charger is an additional component to the car, which adds cost and weight to the car that is un-used when the vehicle is in motion. In particular, on-board chargers can include very heavy magnetic components that are both expensive and bulky. Vehicle weight impedes the efficient operation of the vehicle, especially over the lifetime of the vehicle, and increased bulk reduces the overall storage space available in the vehicle.

A summary of AC level charging is shown in Table I. For AC level 1 charging, the rectifier and DC/DC converter is typically installed on-board the vehicle to provide simple "plug-in and charge" functionality. The charger at this power level delivers up to 1.4 kW to the battery, and can be plugged into any available 120V single-phase residential power outlet. AC level 2 chargers offer EV charging between 4 kW to 19.2 kW from 240V single-phase or three-phase private or public outlets. AC level 3 charging is available at commercial fast charging stations, but requires dedicated off-board hardware to supply power level above 50 kW.

To address charger complexity, combined traction and charging systems have been studied. In various embodiments, a proposed approach is to configure on-board traction components for charging, thus eliminating or greatly reducing the complexity of battery chargers.

Subotic et al. proposed an integrated charger based on a 9-phase traction system [2]. As shown in FIG. 1A, the machine's neutral points can be directly connected to a three-phase AC input, thus requiring no additional hardware between the AC grid and traction system. This topology also produces no net torque for vehicle propulsion in the charging process.

Other multiphase machines for integrated charging are summarized in [3]. In terms of integrated charging via single-phase AC systems, FIG. 1B shows the topology proposed by Pellegrino et al. It employs the traction system as a PFC boost converter, which is interfaced to a single-phase AC source via rectifier [4]. In FIG. 1C, Tang et al. used a set of parallel-connected traction inverters and two motors to charge from a single-phase AC source and thereby eliminates the need for the rectifier [5].

In either topology, the charger requires no additional DC/DC converters, thus addressing weight, volume, and cost considerations of the electric vehicle supply equipment (EVSE). However, in both cases, the minimum allowable battery voltage must always exceed the peak voltage of the AC mains.

TABLE I

STANDARD CHARGING LEVELS [1]

| Charging Level | Charger Location | Topical Use | Expected Power Level |
|---|---|---|---|
| AC level 1 | On-board | Home or office | 1.4 kW (12 A) |
| 120 Vac (US) | 1-phase | | 1.9 kW (20 A) |
| 230 Vac (EU) | 1-phase | | |
| AC level 2 | On-board | Private or public outlet | 4 kW (17 A) |
| 240 Vac (US) | 1- or 3-phase | | 8 kW (32 A) |
| 400 Vac (EU) | | | 19.2 kW (80 A) |
| AC level 3 or DC | Off-board | Commercial charging station | 50 kW |
| 208-600 Vac or Vdc | 3-phase or DC mains | | 100 kW |

For drive applications, the dual inverter traction system uses two traction inverters to increase speed range and battery integration without use of DC/DC power converters or additional magnetic materials, thus offering an efficient and light-weight solution attractive for electric vehicles [6]-[11].

A challenge associated with the dual inverter drive is the need to charge two independent batteries. Hong et. al demonstrated that a single charger could be utilized for charging both batteries [12]. Shown in FIG. 1D, the primary battery is charged using a standalone charger, while the secondary battery is charged from the first via the traction system.

Combined Drive and Fast Charger

A proposed converter topology is provided in some embodiments, which introduces a new integrated charger offering cost-effective and convenient EV charging from any AC power outlet.

In the proposed topology, many or all of the additional magnetic components of the conventional on-board charger designs can be eliminated with the use of innovative control mechanisms, in conjunction with re-using the existing magnetic components available in the electric motor for charging. Corresponding systems, circuits, mechanisms, methods, and computer-readable media are also provided.

In some embodiments, a controller is provided for use with a specially configured converter topology, the controller providing control commands, which when applied to switches of the specially configured converter topology, control the configured converter for power transfer across circuit components. The controller, in some embodiments, may be provided separately from the proposed converter topology.

The proposed converter is capable of operating both as a drive and as an AC fast charger. The AC fast charger functionality is, in some embodiments, added without any additional magnetics as the motor is used in both scenarios, thus presenting a cost-effective solution that utilizes the installed components of a vehicle (i.e., existing components can be reused alongside an innovative approach to circuit control). These installed components (i.e., pre-existing components), for example, include substantial electrical and magnetic components that can be used for fast charging. Weight and bulk savings are thus possible.

A non-trivial, technical challenge that arises is thus to control the characteristics of operation of these components (taking advantage of the electro-mechanical components of the electric motor) to provide both drive and fast charging functionality. Various embodiments are described whereby one or more topologies, in conjunction with specific control techniques and methods (e.g., analog/digital signal control, complementary switching, gating) are used to transfer energy between the components. These topologies may be designed, among other features, to provide improved power/current/voltage shaping, power processing, and distortion reduction. Further approaches include the application of interleaved switching, inductor current control, energy balancing, among others.

As a drive, the topology is configured to enable the use of high voltage motors and as a charger, the topology can be configured to minimize low frequency harmonics by operating akin to a dual stage power factor correction converter.

The topology of some embodiments may be capable of accommodating common commercial input AC voltages including 208V commercial, 277V/480V commercial (US), 240/400V (EU) and 347V/600V commercial (Canada) when charging. For example, such an example implementation may provide advantages in retrofitting or ensuring compatibility with existing infrastructure.

An example proposed on-board integrated charge and drive system is shown in FIG. 2A and FIG. 2B where a rectifier is connected across the differential connection of two traction inverters to enable rapid charging of dual storage media without a standalone charger.

While the two energy storage sources in the figure are batteries, any energy storage source may be used (i.e. batteries, supercapacitors, fuel cells, or any combination thereof). There may be improvements in having a diversity of energy storage sources. For example, the difference in characteristics may be taken of advantage (e.g., a capacitor along with a battery) in controlling power flow through the circuit. For demonstration purposes, batteries are used, but as described, the example with batteries is non-limiting and other types or combinations of energy storage sources is possible.

The structure of the example topology provides two lower voltage batteries to be indirectly series connected through two traction inverters. This example configuration implies that the voltage range is expanded, thus allowing for higher input AC voltages to be accommodated at input to the rectifier without the need for a boost type converter.

A. Single-Phase AC Charging

The single-phase charging configuration is shown in FIG. 2A. The AC power outlet of this example is directly connected to the proposed on-board integrated charge and drive system. The isolation transformer may not be necessary, depending on requirements, and may be included in some embodiments. If required, the transformer itself could be installed at the charging station.

The traction component of an embodiment is operated as a DC/DC converter with improved voltage range, and an innovative modulation and control method is administered to minimize resulting harmonics from propagating into the AC grid during the charging process.

In some embodiments, there is a requirement that the maximum expected input voltage, $V_{in}$, at the differential terminals of the dual traction inverters is the peak voltage of the AC source, and thus the sum of the energy storage device (e.g., battery) voltages must be greater than the peak voltage under all state-of-charge conditions. This design enables AC electric vehicle charging without the use of a dedicated battery charger, having considerable potential for cost, weight, space, efficiency savings, and convenience for the customer/user.

B. Three-Phase Ac Charging

An example three-phase charging configuration is shown in FIG. 2B. The charging interface is nearly identical to the single-phase configuration. A benefit of the single-phase over three-phase configuration is that the traction inverters can be operated to track the rectified single-phase AC waveform and minimize harmonic impact on the grid, which is not possible for three-phase AC rectifiers.

Nevertheless, three-phase connection is possible, but additional charging infrastructure may need to be installed to filter induced harmonics.

C. Alternative Configurations

Detailed circuit diagrams of the proposed on-board integrated charge and drive system are shown in FIG. 2C and FIG. 2D. Due to the inherent symmetry in this system, there are two possible connection points for the output of the AC/DC stage (e.g., a AC/DC converter front end circuit). In both configurations, a battery pack is connected to each upper and lower inverter.

The input can be connected to either the outer or inner differential rails of the traction system. Although the input for the configuration presented in FIG. 2D is inverted, both provides the same charging functionality with minor differences in their control methods. Various embodiments are possible with the configuration presented in FIG. 2C.

PRINCIPLE OF OPERATION OF SOME EMBODIMENTS

Figure 2E:
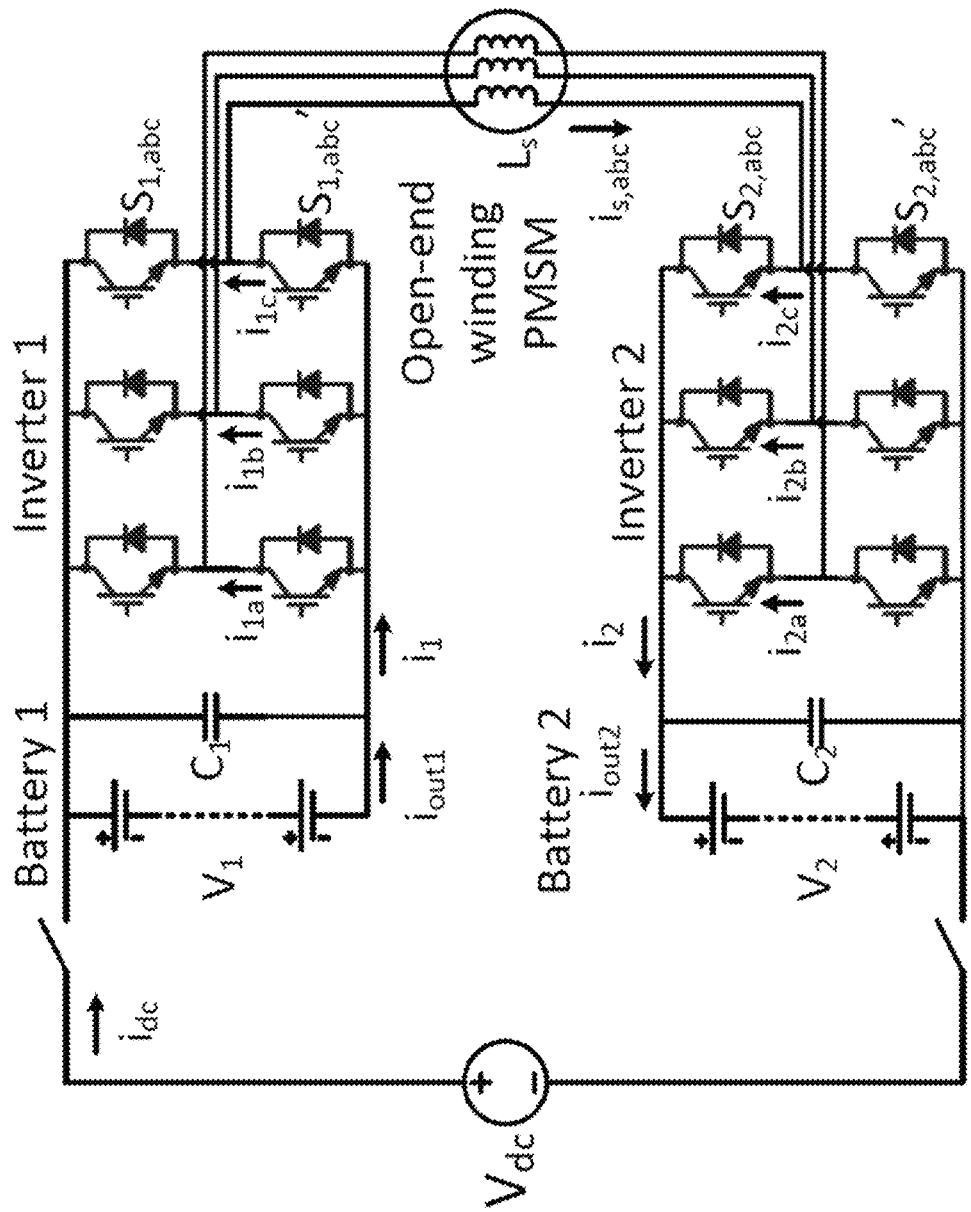
FIG. 2E is a circuit topology illustrating a single-phase charging configuration, according to some embodiments.

An example topology is provided, as depicted in FIG. 2E, that operates as an on-board charger and as a drive. As a drive, the topology would normally operate as a dual inverter drive when the EV is in motion. An innovative step is the integration of the on-board charger with the drive system and the drive system is operated as a DC/DC converter in charging mode. Various functionality and structural features are proposed to provide this integration.

Figures 3A, 3B:
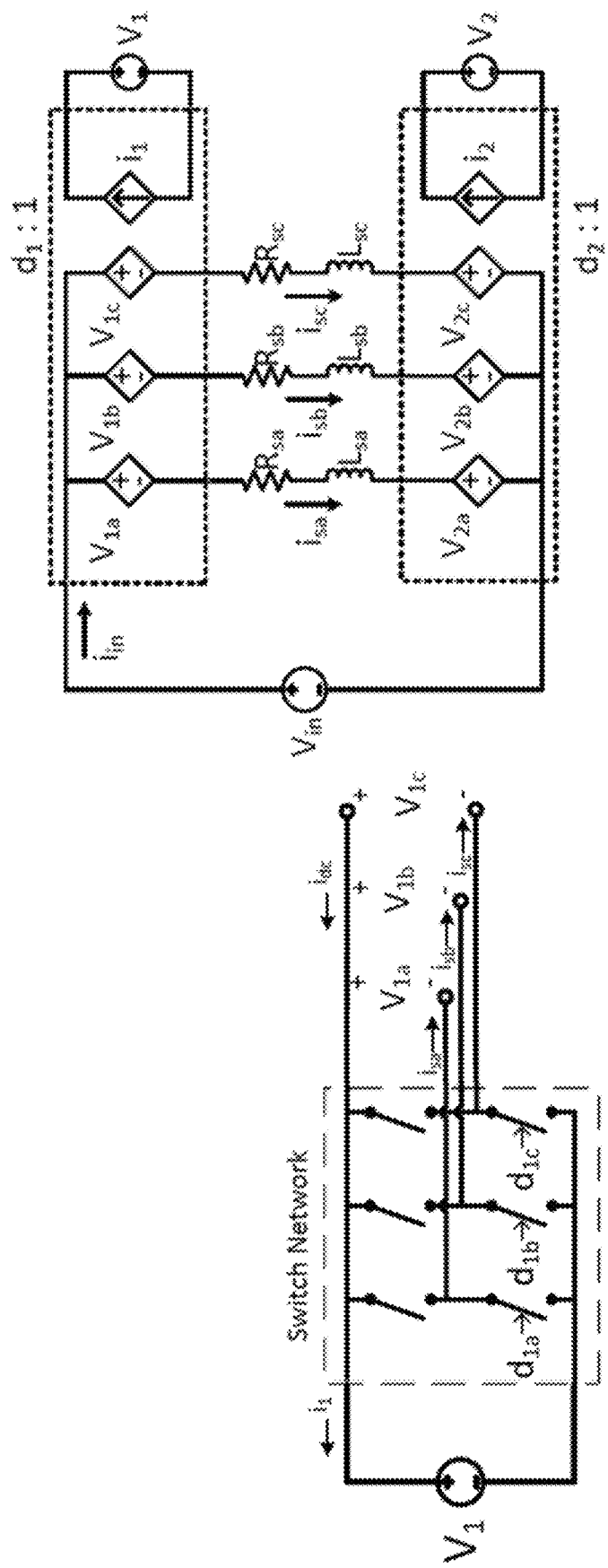
FIG. 3A is a circuit model of the upper module, according to some embodiments.
FIG. 3B is an average model, according to some embodiments.

Specifically, a potential principle of operation is analyzed via the average model depicted in FIG. 3B. A modulation scheme to improve switching harmonic performance and utilize the installed components is also provided, in accordance with some embodiments. A circuit model of the upper module is shown in FIG. 3A.

Figure 2F:
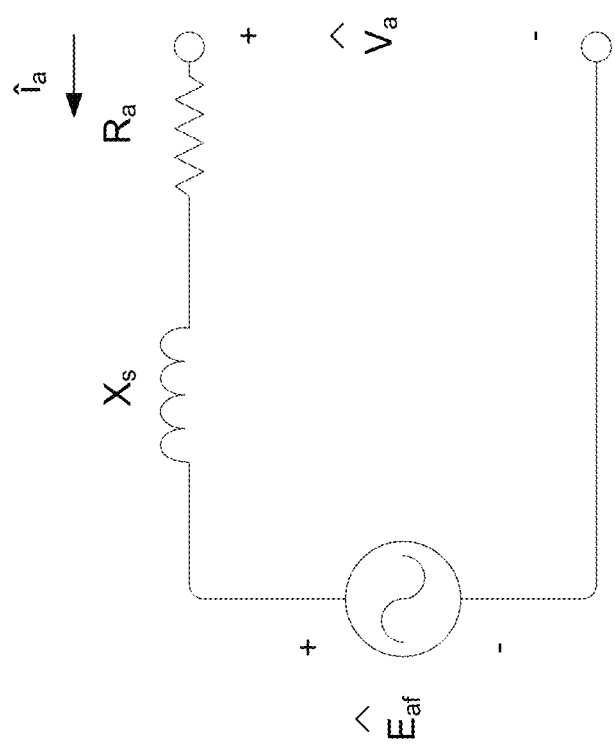
FIG. 2F is a circuit representation of an electrical model of a motor.

Embedded in the average model of FIG. 3B is the representation of the motor as an inductance. In some embodiments, a permanent magnet synchronous motor (PMSM) is used. Referring to the electrical model of a motor, an example is shown in FIG. 2F (Fitzgerald, A. E., Kingsley, C., & Kusko, A. (1971). Electric machinery: The processes, devices, and systems of electromechanical energy conversion. New York: McGraw-Hill) where the back EMF denoted by $E_{fa}$ is dependent on the rotating speed of the motor. If the motor is not spinning, $E_{fa}$ equates to 0 and the motor model reduces to an inductance. Note that this system is not limited to the use of a PMSM only, and embodiments include the use of other motor types.

A. Average Model

An average model of the dual inverter is developed for identical energy storage integration, as in the case of the split-battery pack. Battery pack balancing will be addressed further in this description. A dynamic model of the half-bridge network for a multilevel converter was developed in [13], but a model can also be used to represent the average switch model.

Each of the six half-bridge converters can be modeled as an ideal, controlled voltage source. The voltage depends on the duration in which the storage unit is inserted. The battery currents, $i_1$ and $i_2$, are derived from the power balance. Although power flow can be bidirectional, $V_{in}$ is provided in this example as the input and $V_1$ & $V_2$ as outputs.

In FIG. 3B, each half-bridge is modeled as:

$$V_{1i}=d_{1i}V_1 \quad (1)$$

$$V_{2i}=d_{2i}V_2 \quad (2)$$

where i={a, b, c} for 3 interleaved DC/DC stages.

Only the switch network in the upper module is shown because the two inverters of this example are identical, except that $V_{2i}$ is the average voltage measured across the bottom set of switches instead of the top. As shown in (1) and (2), the duty cycle regulates the duration in which each energy storage (e.g., battery) voltage, $V_1$ and $V_2$, is inserted. Thus, the average voltage across each set of switches is a fraction of the associated energy storage (e.g., battery) voltage. Switch averaging for a single half-bridge was also discussed in [14].

Note that the following relation:

$$d_1=d_{1i} \quad (3)$$

$$d_2=d_{2i} \quad (4)$$

is valid for this analysis assuming identical half-bridge switch networks at the top and bottom.

Applying KVL to any arbitrary phase (neglecting losses), the voltage conversion ratio is:

$$V_{in}=V_1 d_{1i}+V_2 d_{2i} \quad (5)$$

Assuming $d_{1i}=d_{2i}=d$ for an idealized symmetric system yields:

$$V_{in} = (V_1 + V_2)d \quad (6a)$$

$$\frac{V_1 + V_2}{V_{in}} = \frac{1}{d} \quad (6b)$$

Notice the conversion ratio is similar to that of the boost converter, suggesting $V_1+V_2 \geq V_{in}$ to enable boost operation. This is not a limiting factor for EV charging because the charging station's DC output voltage is 60 V to 500 V [15], and each string of EV battery cells spans from 300V to 500V [16].

By assigning one battery string to each module, the minimum output voltage always exceeds the input voltage. Furthermore, the battery management system shall not permit the battery to discharge below the minimum voltage specified by the manufacturer.

FIG. 3B shows that the DC input current is the sum of the inductor currents:

$$i_{dc}=i_{sa}+i_{sb}+i_{sc} \quad (7)$$

Output currents $i_1$ and $i_2$ can be derived from power balance:

$$V_1 i_1 = V_1 d_1 (i_{sa}+i_{sb}+i_{sc}) \quad (8a)$$

$$i_1 = i_{dc} d_1 \quad (8b)$$

$$i_2 = i_{dc} d_2 \quad (8c)$$

where $i_1$ and $i_2$ are fractions of the DC input current set by the duty cycle in each module.

Table II is a table of switching states in relation to the switches, and the status of the upper module and lower module based on the complementary operation of the switches.

TABLE II

Switching States

| $S_{1i}'$ | $S_{2i}$ | Upper module | Lower module |
|---|---|---|---|
| on | on | insert | insert |
| on | off | insert | bypass |
| off | on | bypass | insert |
| off | off | bypass | bypass |

Using (8), the average power supplied to each battery pack is:

$$P_1 = V_1 i_{dc} d_1 \quad (9a)$$

$$P_2 = V_2 i_{dc} d_2 \quad (9b)$$

The average current into the battery is thus a function of the combined stator currents and duty cycle. Through proper switching action (and corresponding control) of the half-bridge switch networks, charger of some embodiments can effectively control the individual battery pack currents.

Switching Sequence

In an illustrative example, $d_{1i}$ and $d_{2i}$ are mapped to inner switches $S_{1i}'$ and $S_{2i}$, respectively. For instance, $$S_{1a}'(t) = \begin{cases} 1, & 0 < t \le d_{1a} T_{sw} \\ 0, & d_{1a} T_{sw} < t \le T_{sw} \end{cases} \quad (10)$$

Figure 4:
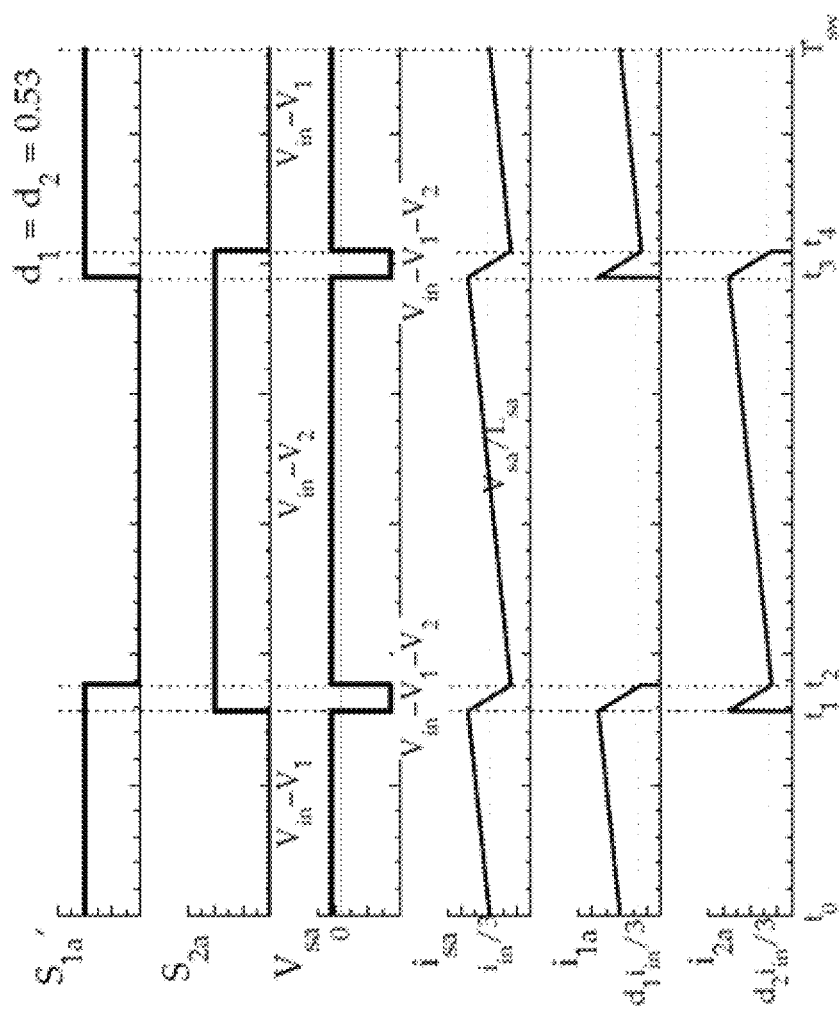
FIG. 4 illustrates example gating signals for the inner switches, $V_{sa}$, $i_{sa}$, $i_{1a}$, and $i_{2a}$, according to some embodiments.

Complementary switching: A complementary strategy is applied to switches between the upper and lower modules. Thus, the following analysis examines the impact of complementary switching on phase "a". Gating signals for the inner switches, $V_{sa}$, $i_{sa}$, $i_{1a}$, and $i_{2a}$ are shown in FIG. 4.

Under balanced load conditions, each pair of "inner" and "outer" switches have the same percentage on-time in one switching period. However, the gating pulses between the two modules can be phase-shifted by 180° as demonstrated in [17]. This strategic overlap of gating pulse can potentially reduce the energy variation in the inductor, resulting, for example, in half the ripple current at twice the switching frequency.

The peak-to-peak inductor current ripple for $V_1 = V_2 = V_0$ (idealized symmetric system) is $$\Delta i_s = \frac{(V_{in} - V_o) d' T_{sw}}{L_s} \quad (11a)$$

-continued $$\Delta i_s = \frac{V_{in} T_{sw}}{L_s}\left(1 - \frac{V_o}{V_{in}}\right)\left(1 - \frac{1}{2}\frac{V_{in}}{V_o}\right) \quad (11b)$$

where the second expression is derived by combining (6b) and (11a).

Figure 5:
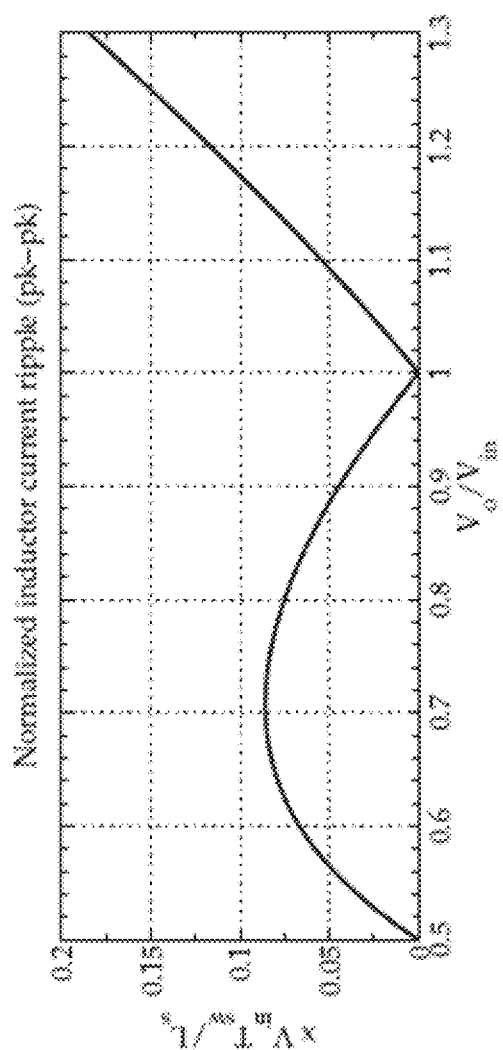
FIG. 5 is a plot illustrative of inductor current ripple, according to some embodiments.

Plotting (11b) in FIG. 5, this expression highlights one of the features of the circuit topology of one or more preferred embodiments: the inductor energy variation, or current ripple, depends on the voltage difference $V_{in} - V_o$. Notice for the case where the battery packs are balanced, and $V_1 = V_2 = V_{in}$ this yields zero inductor current ripple. The ideal operating range is centered around $$\frac{V_o}{V_{in}} = 1$$

to minimize distortion in the supply lines.

The branch current of $i_1$ and $i_2$ from any arbitrary phase, denoted by $i_{1i}$, pulsates due to the discontinuous conduction of the switch network:

$$i_{1i} = i_{si} S_{1i}' \quad (12)$$

$$i_{2i} = i_{si} S_{2i} \quad (13)$$

Notice that the inductor ripple also propagates into the battery. Since the inductor ripple is negligible relative to the pulsating current generated by summing the branch currents, complementary switching has minimal effect on the battery currents. Thus, to minimize current harmonics in the batteries, interleaved switching between parallel phases can be used. The proposed switching method also reduces the switching ripple at the DC input.

Figure 6:
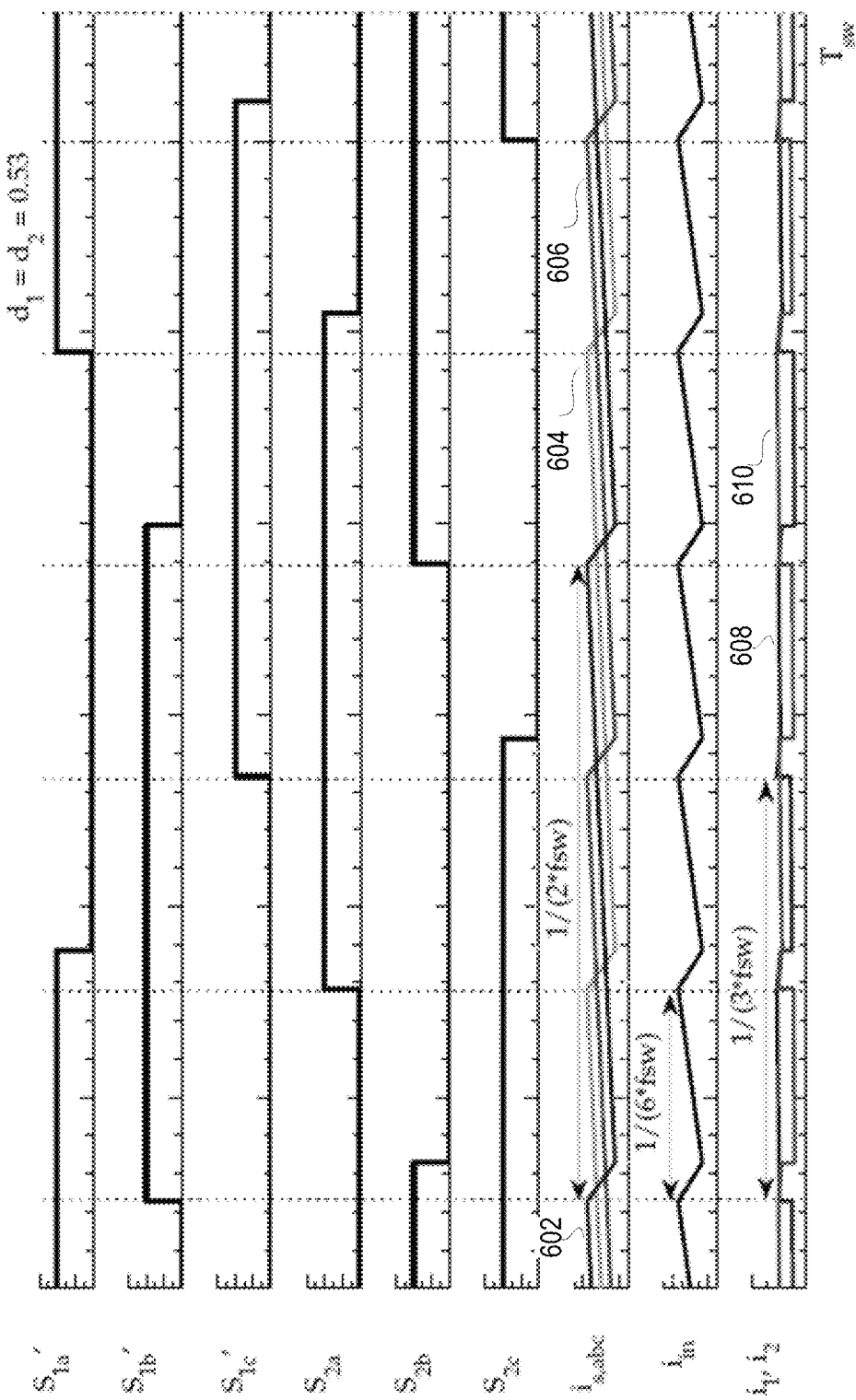
FIG. 6 is a plot of complementary and interleaved switching sequence for inner switches operated at d=0.53, according to some embodiments.

2) Interleaved switching: This switching strategy has not been previously studied in an integrated charger based on the dual inverter. As shown in FIG. 6, the gating pulses between phase a 602, b 604, and c 606 can be phase shifted by 120°. This further reduces the peak ripple observed in $i_{dc}$. $i_1$ and $i_2$ are shown in current flows 608 and 610.

Due to the phase-shift of stator currents, the peak-to-peak $i_{dc}$ is approximately ⅓ of the ripple generated using in-phase switching, and the most significant switching component is shifted to the 6th harmonic.

Figure 7:
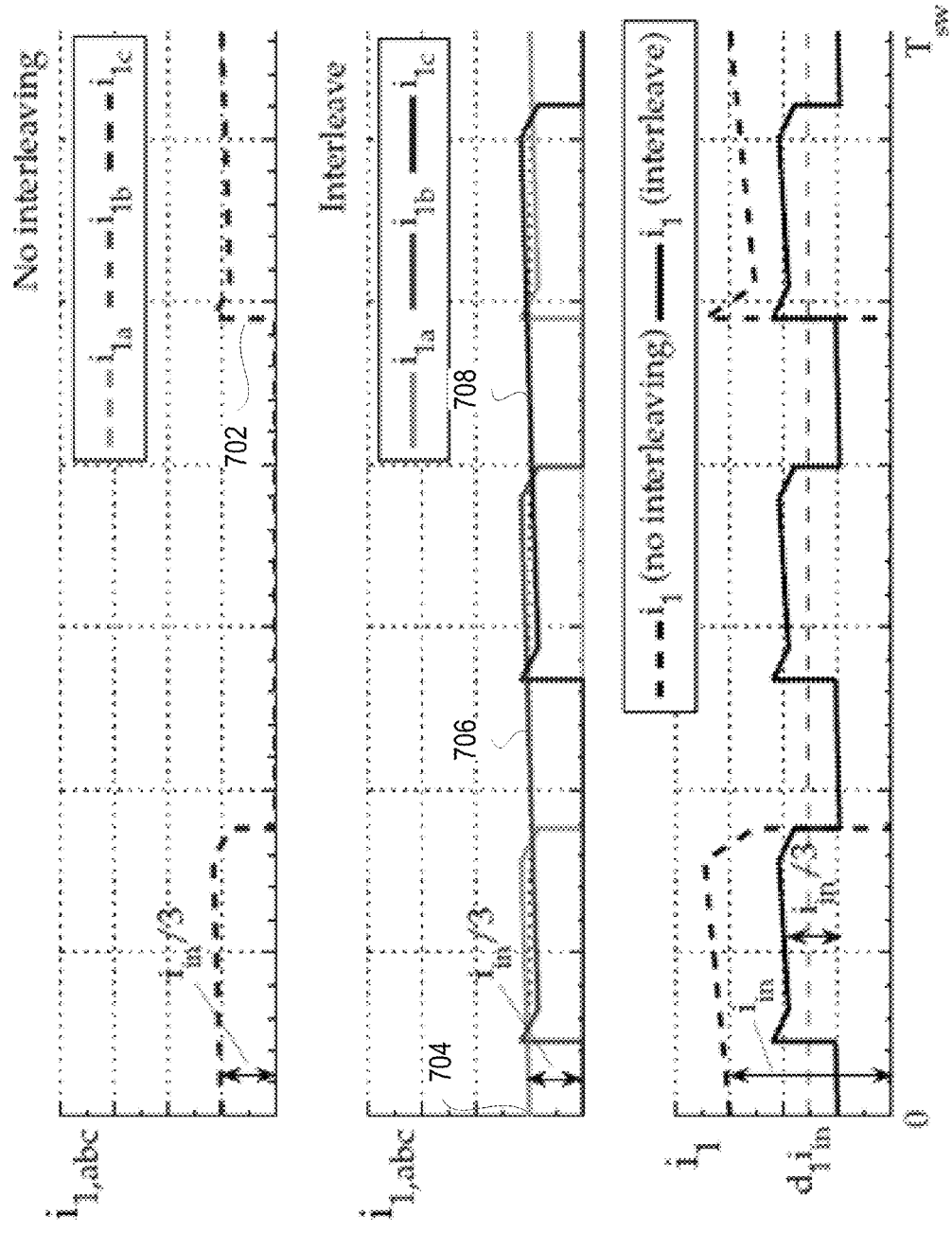
FIG. 7 is a plot of phase currents, according to some embodiments.

FIG. 7 shows the impact of phase interleaving on output currents $i_1$ and $i_2$. As discussed previously, the currents in all switches are "chopped" regardless of the switching pattern. Phase currents in the top plot 702 overlap when interleaving is not applied. Interleaved switching (currents 704, 706, 708 are shown and are interleaved with one another) increases the ripple frequency and reduce peak-to-peak ripple.

The unfiltered energy storage device (e.g., battery) currents are the sum of the pulsating currents in the inner switches:

$$i_1 = i_{1a} + i_{1b} + i_{1c} \quad (14)$$

$$i_2 = i_{2a} + i_{2b} + i_{2c} \quad (15)$$

To reduce/minimize the switching ripple due to discontinuous conduction, interleaved switching enables continuous conduction of $i_1$ and $i_2$ for ⅓<d<1. The energy storage device (e.g., battery) currents conduct through at least one of the 3 phases (e.g., in a period). The third plot in FIG. 7 shows that at d=0.53, interleaving results in approximately ⅓ of the ripple component, and the most significant harmonic is shifted to $3_{f_{sw}}$. The contribution of the inductor current ripple to the total harmonic distortion in $i_1$ and $i_2$ is negligible at this operating point.

In summary, the proposed switching sequence produces is $\Delta i_{s,abc}$, $\Delta i_{dc}$, and $\Delta i_{1,2}$ at $2f_{sw}$, $6f_{sw}$, $3f_{sw}$ respectively. This effectively leads to reduced THD and semiconductor losses. Reduction in peak-to-peak output current ripple also helps to prevent energy storage device (e.g., battery) capacity fade and impedance degradation [18].

Control Strategies

The topology is utilized when appropriate controls are applied to reduce low frequency harmonic components, and to transfer energy between the two energy storage devices (e.g., batteries).

Recall that an ideal, symmetrical system having balanced energy sources was studied in previous sections. This allows the controller to set equal duty cycles to both the upper and lower modules. To address the scenario where the isolated energy storage device (e.g., battery) packs have a different state-of-charge during the charging process, the duty cycles are decomposed into sum and difference terms, defined as:

$$\begin{bmatrix} d_1 \\ d_2 \end{bmatrix} = \begin{bmatrix} \frac{1}{2} & -1 \\ \frac{1}{2} & 1 \end{bmatrix} \begin{bmatrix} \Sigma d \\ \Delta d \end{bmatrix} \quad (16)$$

The objective of the DC charger is to 1) regulate the DC inductor current using the sum component 2) equalize the stored energy in the split energy source using the difference component. Note that coupling between the two terms may be present.

A. Inductor Current Control

Figure 8:
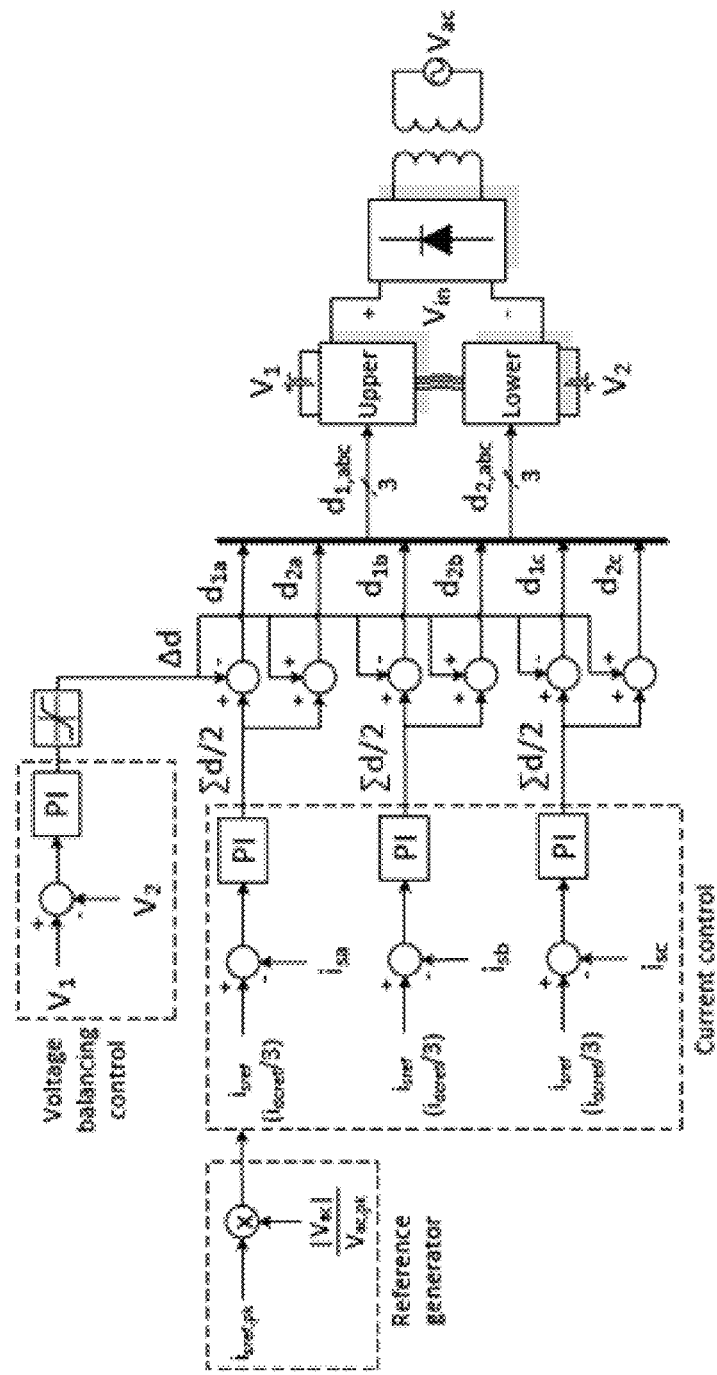
FIG. 8 is a control diagram, according to some embodiments.

In FIG. 8, an example implementation for the current control of three parallel phases is presented. In this current control, the inductor current will track one-third of the input current reference. Furthermore, to implement power factor correction, the current reference in each stator winding, $i_{sref,abc}$, is a scaled version of the normalized rectified AC voltage.

An expression for the dynamics of the system is developed by applying KVL to the average model:

$$-V_{in} + V_1 d_{1i} + V_2 d_{2i} + i_{si} R_s + L_s \frac{di_{si}}{dt} = 0 \quad (17a)$$

$$i_{si} = \frac{V_{in} - \left(\frac{V_1 + V_2}{2}\right) \Sigma d_i + (V_1 - V_2) \Delta d_i}{R_s + sL_s} \quad (17b)$$

where $d_{1i}$ and $d_{2i}$ have been replaced by $\Sigma d$ and $\Delta d$ as per (16). Ideally, if the energy storage device (e.g., battery) voltages are balanced, then only the sum term drives the input current. However, the difference term is coupled to the current controller. To avoid stability issues, voltage balancing controller will be designed to have significantly slower response to voltage dynamics. Thus, $(V_1-V_2)\Delta d_i$ can be regarded as a DC offset in the time scale of the current controller.

B. Power Shaping

In the single-phase system, the front-end may be a passive rectifier or active rectifier, depending on the type of power switch used. The passive rectifier consists of a diode full-bridge that enables unidirectional power flow, and in this application, it is used to charge the vehicle from the AC grid. Active rectification may use bidirectional switches such as IGBTs to enable power transfer from the vehicle to the grid.

In either configuration, the inductor current can be controlled to eliminate low frequency harmonics at the AC grid. This is achieved by shaping the inductor current reference such that it is in-phase with the rectified grid voltage when charging the vehicle from the grid, and inverted such that the average current is negative when sending power back to the grid. The control implementation requires a voltage sensor to measure the grid voltage.

Figure 14:
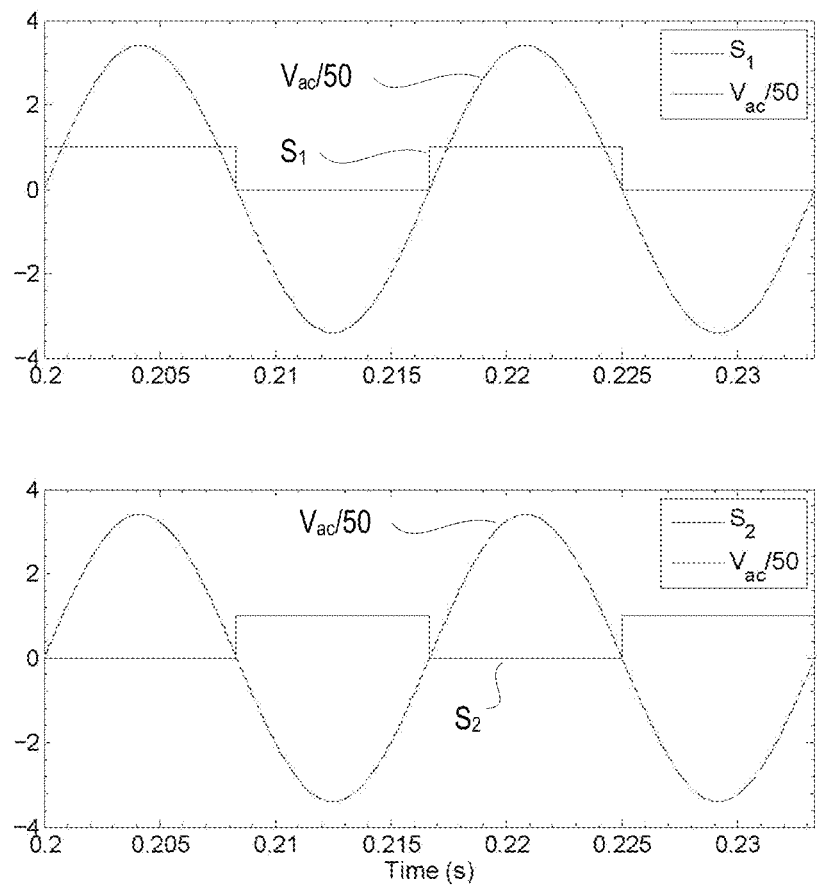
FIG. 14 are waveforms of the single-phase AC charging showing operation of the active front-end system, according to some embodiments.

In the active configuration, the front-end switches are synchronized to the grid voltage. To obtain a rectified sinusoid at the input of the dual inverter, the front-end is controlled such that half of the switches are turned on during one half of a cycle, then the other set of switches are turned on in the other half of the cycle, as illustrated in FIG. 14. Dead-time between switch turn-on and turn-off is also implemented to prevent shorting on the ac-side. The passive configuration does not required any control input, however it can only be utilized for grid-to-vehicle charging.

B.1 Bandwidth Requirements

Figure 9:
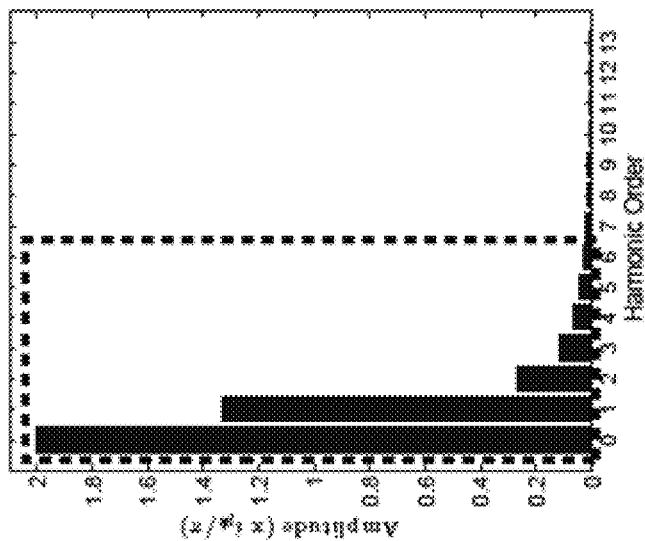
FIG. 9 includes plots of rectified current waveforms and Fourier decompositions, according to some embodiments.
Figure 9:
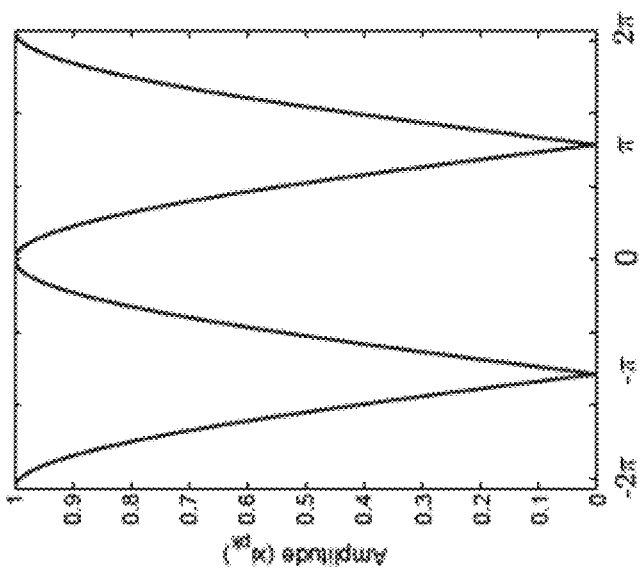

In the current control loop, the controller is configured such that the stator currents to follow a rectified current reference. Therefore, the measured current per phase is predominantly comprised of low frequency harmonics at multiples of the 120 Hz fundamental component, as shown in FIG. 9. A switching ripple at $2f_{sw}$ is also superimposed onto the rectified stator currents. As such, the bandwidth of the controller is determined (or selected) such that it includes the dominant harmonic frequencies and filters out the switching ripple at twice the switching frequency.

Fourier analysis of the rectified current is summarized in Table III. It is determined that the 6th harmonic component reduces to approximately 2% of the fundamental component. Thus, this is selected as the cutoff frequency (720 Hz), which is sufficient to reproduce the rectified waveform. To ensure that the switching ripple is outside the controller bandwidth, the minimum switching frequency, in this example, is set to 7.2 kHz. In the dual inverter drive, the actual minimum switching frequency is 3.6 kHz due to the improved switching method.

C. Energy Balancing

In FIG. 8, the voltage balancing controller takes the voltage difference and outputs $\Delta d$, which is then subtracted from $d_{1i}$ and added to $d_{2i}$. Therefore, if the DC source in the upper module is overcharged relative to the lower module, then the lower module will be inserted more frequently. Both sources are charged simultaneously but with an offset to shift the power distribution. To ensure this offset does not exceed the operating limits of the converter, a limiter may be implemented at the output of the voltage balancing controller.

Control of the energy between the upper module and the lower module is not limited to the DC component as energy at other frequencies may be transferred between modules. In the exemplary case of the upper module containing batteries and the lower module containing capacitors, harmonic energy may be delivered from the battery to the capacitors. The delivery of harmonic energy used to mitigate undesired exposure of the batteries to ripple energy content. Accordingly, in some embodiments, the upper model may contain batteries, and the lower module may contain capacitors, or vice versa.

TABLE III

FOURIER SERIES OF RECTIFIED CURRENT REFERENCE

| Harmonic Order | Frequency (Hz) | Amplitude ($x^{i+HDplc+L}/{+90}$) | % of Fundamental |
|---|---|---|---|
| 0 | 0 | 2 | — |
| 1 | 120 | 1.33 | 100 |
| 2 | 240 | 0.266 | 20 |
| 3 | 360 | 0.114 | 8.57 |
| 4 | 480 | 0.0635 | 4.76 |
| 5 | 600 | 0.0404 | 3.03 |
| 6 | 720 | 0.0279 | 2.1 |
| 7 | 840 | 0.0205 | 1.54 |
| 8 | 960 | 0.0156 | 1.18 |

Note that the balancing controller uses voltage to extrapolate the total stored energy in the DC source. Other parameters may be used for energy management, such as comparing state-of-charge (Coulomb count) of a split-energy storage device (e.g., battery) pack.

RESULTS

Figure 10:
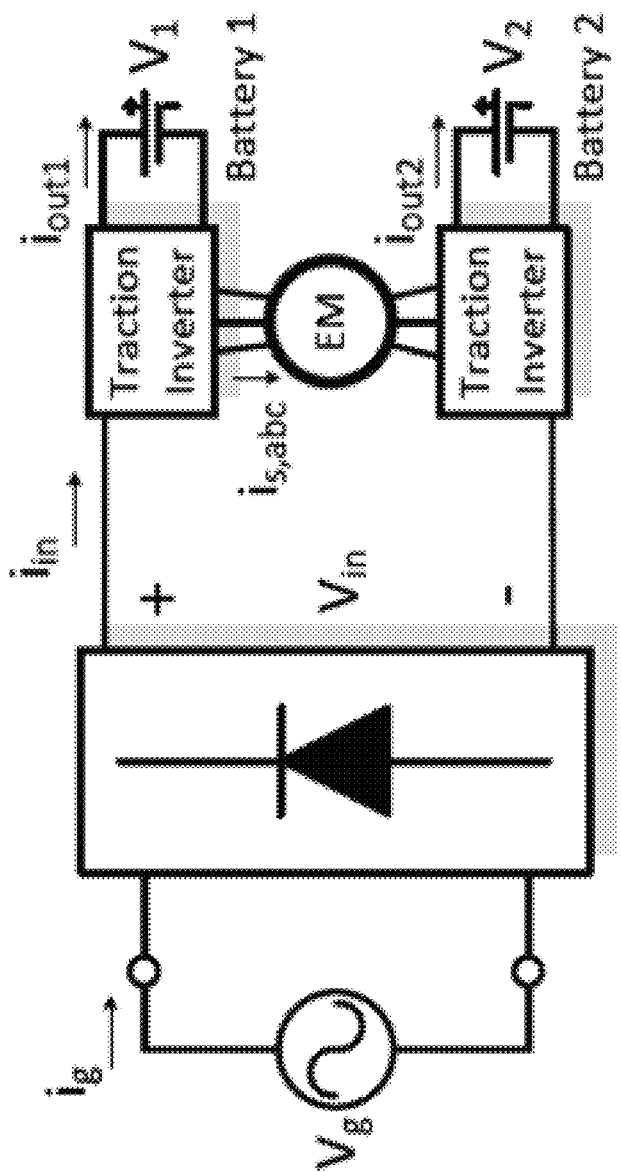
FIG. 10 is a high level diagram of a simulation model, according to some embodiments.

A detailed model of the integrated charging topology is simulated in MATLAB using a PLECS toolbox. The high-level diagram of the system is shown in FIG. 10, according to some embodiments. In this example, two identical battery packs are charged from a 120V single-phase AC source via the on-board single-phase AC fast charger and drive system. In this simulation, the battery packs are replaced by a set of 1 kWh supercapacitor banks to reduce simulation runtime. The average power supplied by the grid is 1.4 kW in compliance with AC level 1 charging. System parameters are listed in table IV.

Figure 11B:
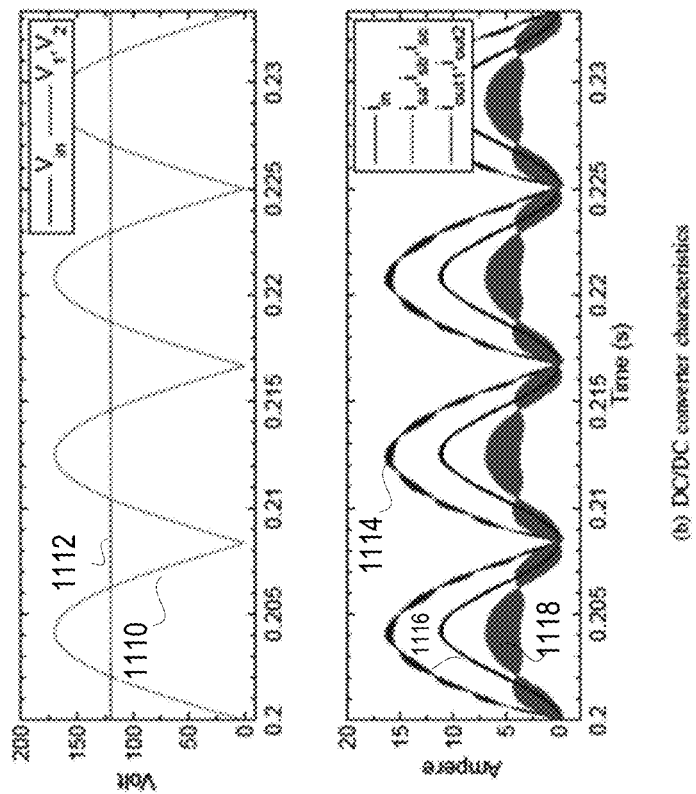
FIG. 11A and FIG. 11B include simulation results of single-phase AC charging using an integrated charge and drive system, according to some embodiments.
Figure 11A:
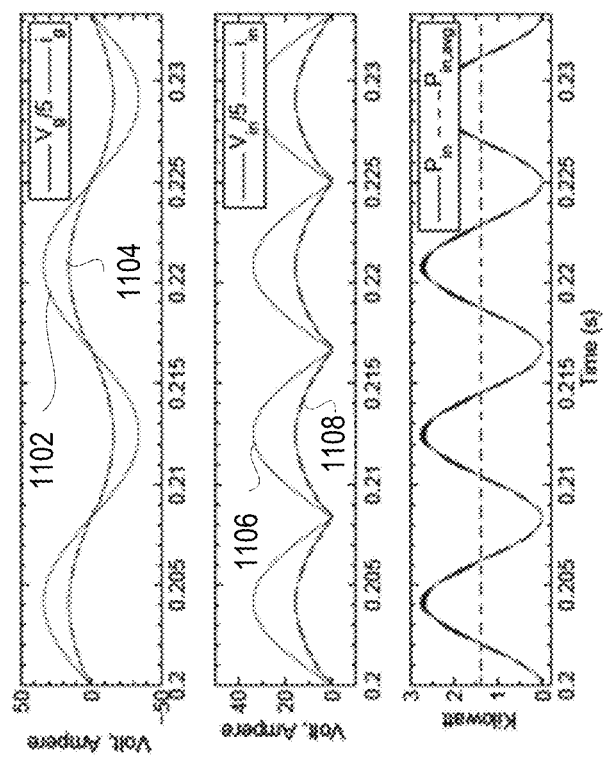

FIGS. 11A and 11B shows the voltage and current quantities of the charger when motor's leakage inductance is used as the interface inductor and the proposed modulation and current controller are used:

TABLE IV

Simulation Parameters

| | Symbol | Value |
|---|---|---|
| Grid Parameters | | |
| Grid voltage | $V_g$ | 120 V |
| Grid current | $i_g$ | 11.7 A |
| Average Power | $P_{avg}$ | 1.4 kW |
| DC/DC stage Parameters | | |
| Peak input voltage | $V_{in,pk}$ | 170 V |
| Output voltage | $V_1, V_2$ | 120 V |
| Peak input current | $i_{in,pk}$ | 16.5 A |
| Peak inductor current (filtered) | $i_{s,pk}$ | 5.5 A |
| Peak output current (filtered) | $i_{out1,pk}, i_{out2,pk}$ | 11.7 A |
| Inductor resistance | $R_s$ | 0.3 Ω |
| Inductance | $L_s$ | 0.5 mH |
| Output filter capacitance | $C_1, C_2$ | 9600 μF |
| Supercapacitor | $C_{sc1}, C_{sc2}$ | 16.6 F |
| Switching frequency | $f_{sw}$ | 9 kHz |

$V_g/5$ is shown at 1102, $i_g$ is shown at 1104, $V_{in}/5$ is shown at 1106, and $i_{in}$ is shown at 1108.

At the grid-side, the voltage and current are in-phase, as well as the rectified waveforms at the differential input. These results verify the functionality of the proposed current controller to regulate the power factor and track the desired current reference.

At the DC/DC converter side, Vin is shown at 1110, with $V_1, V_2$ shown at 1112. Iin is shown at 1114, $i_{sa}, i_{sb}, i_{sc}$, shown at 1118, and $i_{out1}, i_{out2}$ shown at 1116.

Figure 12A:
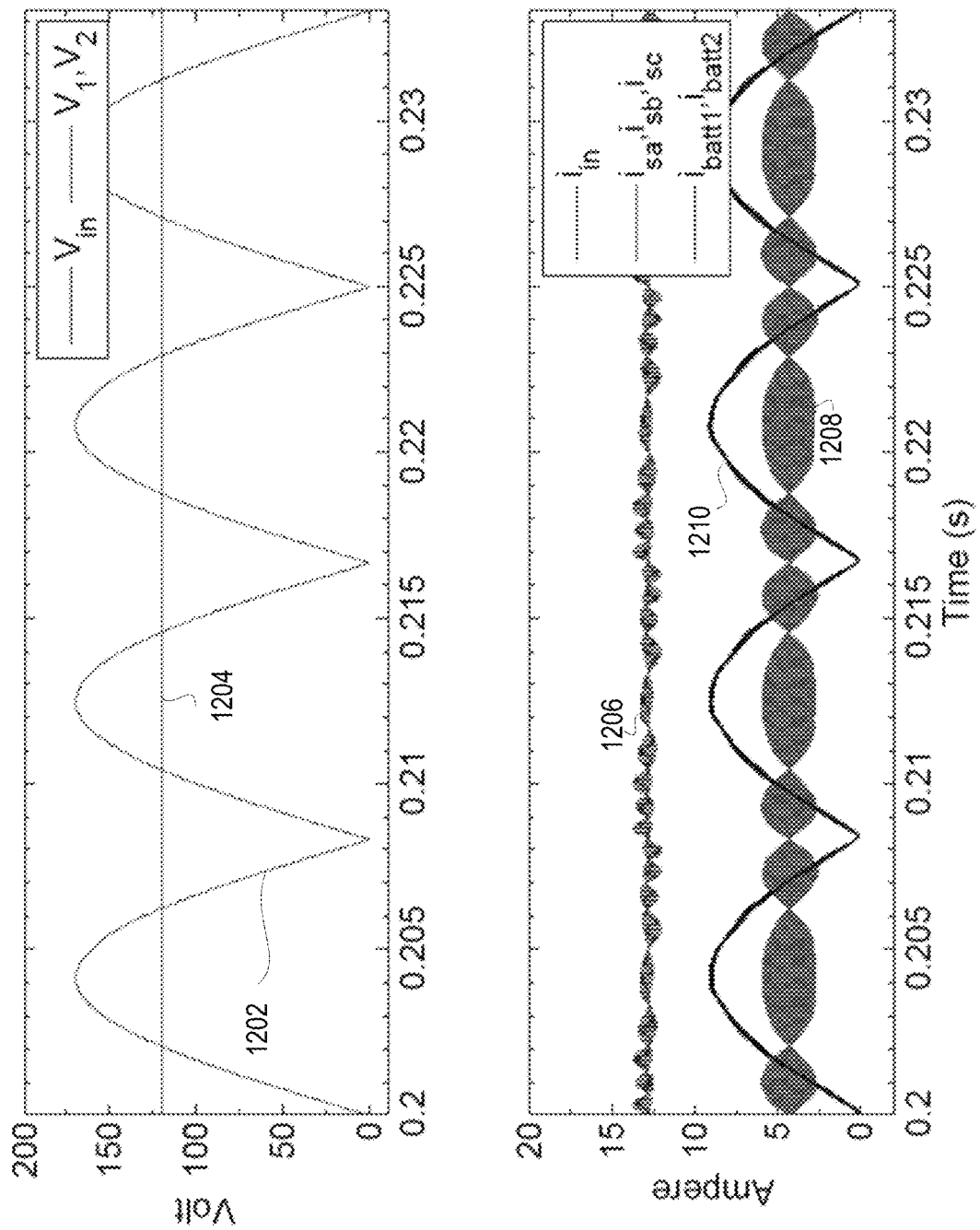
FIG. 12A and FIG. 12B are waveform diagrams of an exemplary case where an alternative current controller is used, which does not reduce grid harmonics.
Figure 12B:
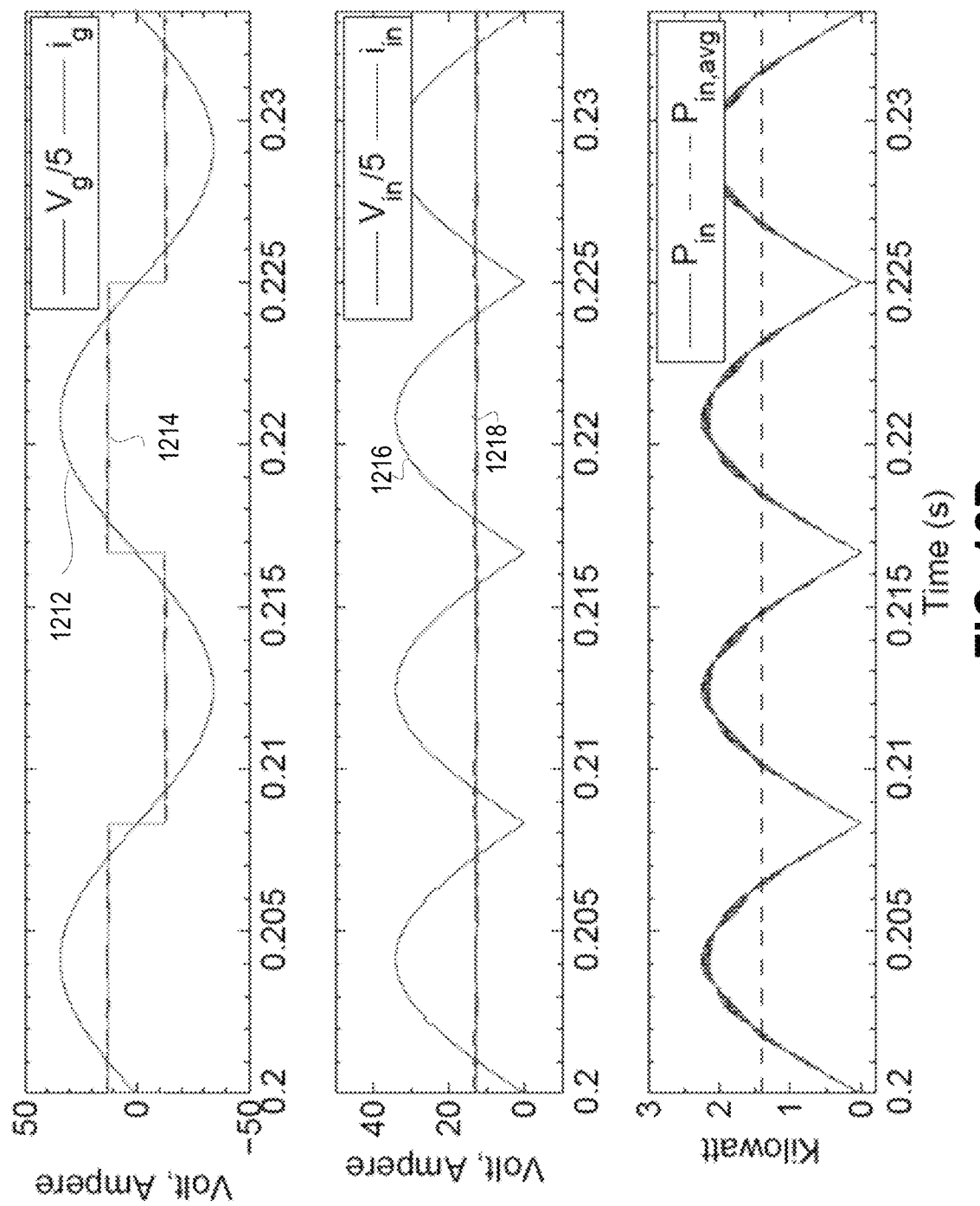

In comparison, an exemplary case where an alternative current controller is used, which does not reduce grid harmonics. This is presented in FIGS. 12A and 12B where the average power transferred to the two energy sources is the same but input current is dc instead of a rectified sinusoid. $V_{in}$ is shown at 1202, and $V_1, V_2$ shown at 1204.

When reflected on the grid side, this introduces undesired low frequency harmonics, which require filtering. Thus, additional stationary (off-vehicle) components will be required (e.g., increasing bulk, cost, and material investment). On FIG. 12A, $i_{in}$ is shown at 1206, $i_{sa}, i_{sb}, i_{sc}$, shown at 1208, and $i_{batt1}, i_{batt2}$ shown at 1210. On FIG. 12B, $V_g/5$ is shown at 1212, and $i_g$ is shown at 1214. $V_{in}/5$ is shown at 1216, and $i_{in}$ is shown at 1218.

Figure 13:
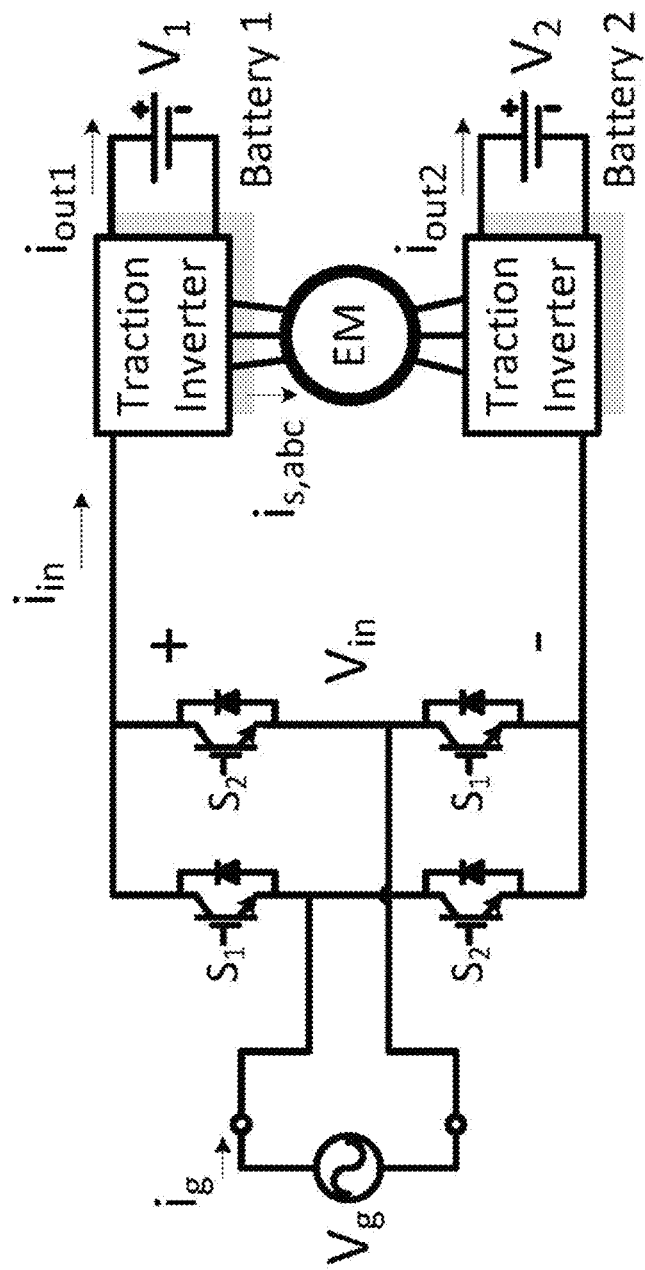
FIG. 13 is a high level diagram of a simulation model using an active front-end, according to some embodiments.

Integrated charging using the active front-end is also simulated. The simulation model is consistent with that of FIG. 13, and the synchronous control of the front-end switches are shown in FIG. 14.

Figure 15A:
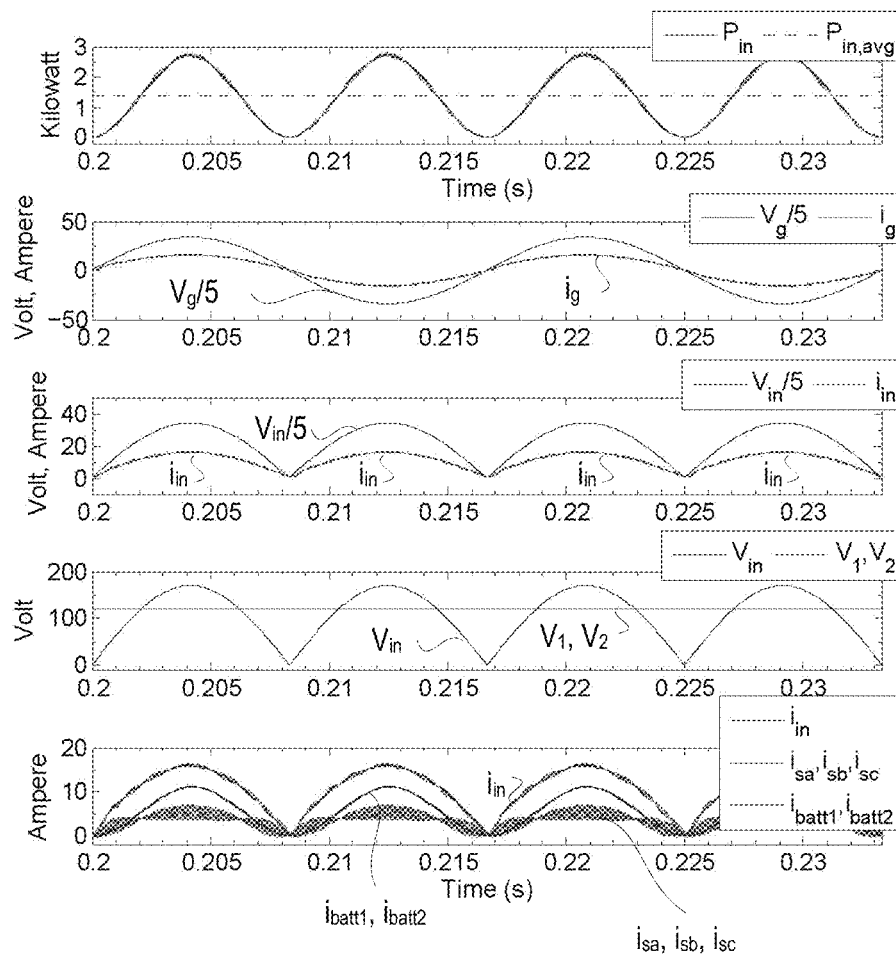
FIG. 15A and FIG. 15B present simulation results of the integrated charger and drive system with an active front-end when power is being delivered from grid-to-vehicle and from vehicle-to-grid, respectively.
Figure 15B:
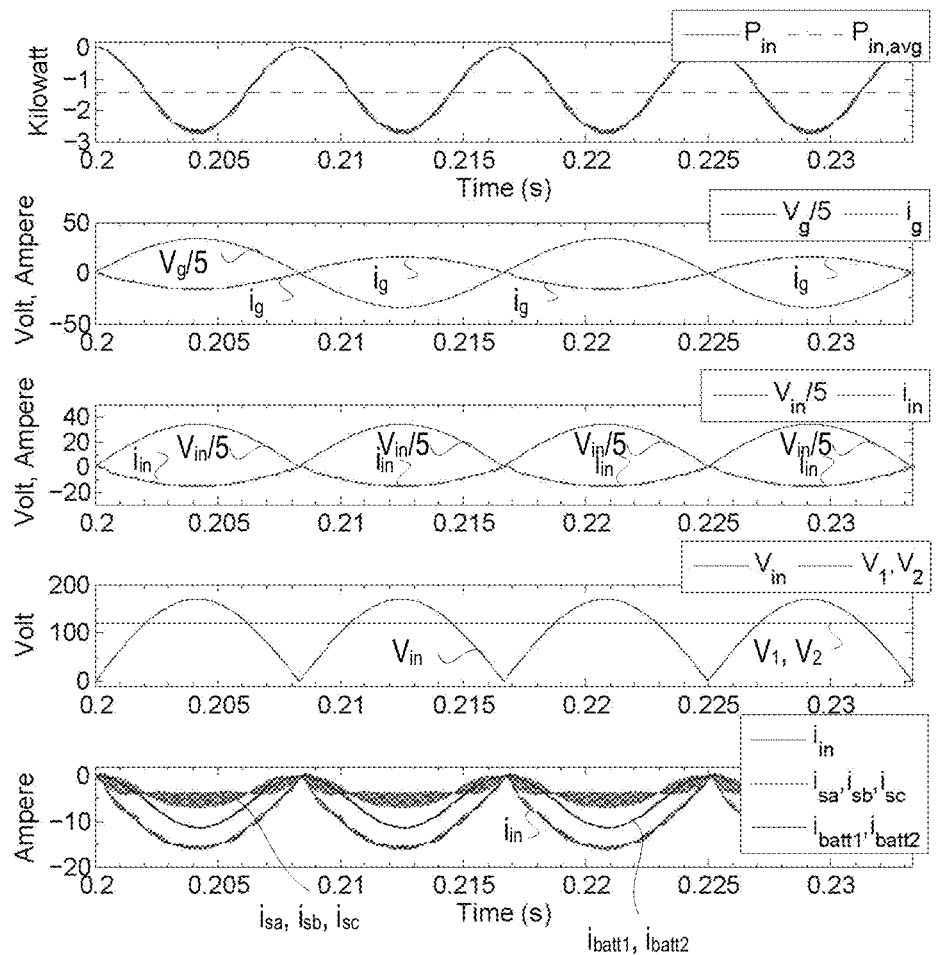

The simulation results of FIG. 15A show vehicle charging from the AC grid using the active front-end, hence the average power is positive. Similar to the passive configuration in FIG. 10, the input current is shaped to match the grid voltage, thus generating minimal low frequency harmonics on the grid-side. In FIG. 15B, the current reference is set such that it is inverted across the x-axis. The grid current is exactly 180° out of phase with the grid voltage. This allows the system to send power back to the grid as indicated by the negative average power.

The inductor current per phase tracks approximately one-third of the input current. As such, only zero-sequence current is injected into the motor windings to ensure minimal generation of net torque during standstill charging. By applying complementary and interleaved phase shift to the PWM modulation scheme, there is significantly less harmonic distortion injected into the grid. In addition, due to the rectified voltage at the input, the output (battery) currents see a dominant 120 Hz component.

There is insufficient study on the impact of low frequency harmonics on energy storage device (e.g., battery) health, but in general, this system is a cost-effective method to leverage on-board drive components for directly charging the energy storage device (e.g., battery).

In this operating scenario, the output voltage is set to 120V, which is less than the peak value of the rectified input voltage. In the other works, the integrated charger using a single traction drive, the system can only be operated as a boost PFC [4]. This requires the energy storage device (e.g., battery) voltage to exceed the grid voltage under all state-of-charge conditions. As shown in FIG. 11(b), with the proposed embodiments of dual inverter type, charging is possible even though each battery voltage is less than the grid voltage.

An innovative on-board integrated charge and drive system offering cost-effective and convenient EV charging from any AC power outlet is provided. As provided in various examples, the converter is configured of operating both as a drive and as an AC fast charger.

The AC fast charger functionality is added without any additional magnetics as the motor is used in both scenarios, thus presenting a cost effective solution that more readily utilizes the installed components of a vehicle. Additional control components may be provided to adapt power transfer.

As a drive, the circuit topology enables the use of high voltage motors and as a charger, and the circuit topology is configured to utilize the installed electronics to reduce/minimize low frequency harmonics and switching frequency harmonics. The topology can be capable, in some embodiments, of accommodating various common commercial input AC voltages including, for example, 208V commercial, 277V/480V commercial (US), 240/400V (EU) and 347V/600V commercial (Canada) when charging.

In comparison to other approaches for integrated charging, this system is compatible with a wide range of EV energy storage device (e.g., battery) sizes, and has minimal impact on the power quality of the grid. The proposed topology of some embodiments has a charging rate is limited by thermal constraints of the motor and traction power electronics, thus highlighting its ability to charge the vehicle directly from existing grid infrastructure.

With respect to the control features, program code can be applied to input data to perform the functions described herein and to generate output information, include output control signal waveforms or messages.

Throughout the foregoing discussion, numerous references will be made regarding controllers or other controller devices. It should be appreciated that the use of such terms is deemed to represent one or more software, hardware, firmware, or computing devices.

These devices may be configured to execute instruction sets that indicate gating timings, machine-readable instructions, among others, and may be configured for interoperation with other devices, for example, by way of wired or wireless interfaces, etc. Signals may be propagated that control downstream components, such as high frequency switches, among others.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

REFERENCES

[1] M. Yilmaz and P. T. Krein, "Review of charging power levels and infrastructure for plug-in electric and hybrid vehicles," 2012 *IEEE International Electric Vehicle Conference (IEVC)*, Greenville, SC, 2012, pp. 1-8.
[2] I. Subotic, E. Levi, M. Jones and D. Graovac, "On-board integrated battery chargers for electric vehicles using nine-phase machines," 2013 *International Electric Machines & Drives Conference*, Chicago, IL, 2013, pp. 226-233.
[3] I. Subotic, N. Bodo, E. Levi, B. Dumnic, D. Milicevic and V. Katic, "Overview of fast on-board integrated battery chargers for electric vehicles based on multiphase machines and power electronics," in *IET Electric Power Applications*, vol. 10, no. 3, pp. 217-229, 3 2016.
[4] G. Pellegrino, E. Armando and P. Guglielmi, "An Integral Battery Charger With Power Factor Correction for Electric Scooter," in *IEEE Transactions on Power Electronics*, vol. 25, no. 3, pp. 751-759, March 2010.
[5] Lixin Tang and G. J. Su, "A low-cost, digitally-controlled charger for plug-in hybrid electric vehicles," 2009 *IEEE Energy Conversion Congress and Exposition*, San Jose, CA, 2009, pp. 3923-3929.
[6] D. M. Vilathgamuwa, S. D. G. Jayasinghe, F. C. Lee, U. K. Madawala, "A unique battery/supercapacitor direct integration scheme for hybrid electric vehicles," in *IECON 2011-37th Annual Conference on IEEE Industrial Electronics Society*, vol., no., pp. 3020-3025, 7-10 Nov. 2011.
[7] D. Casadei, G. Grandi, A. Lega; C. Rossi, "Multilevel Operation and Input Power Balancing for a Dual Two-Level Inverter with Insulated DC Sources," *IEEE Trans. on Ind. Applicat.*, vol. 44, no. 6, pp. 1815-1824, Nov.-Dec. 2008.
[8] Y. Lee and J. I. Ha, "Hybrid Modulation of Dual Inverter for Open-End Permanent Magnet Synchronous Motor," in *IEEE Transactions on Power Electronics*, vol. 30, no. 6, pp. 3286-3299, June 2015.
[9] Junha Kim, Jinhwan Jung and Kwanghee Nam, "Dual-inverter control strategy for high-speed operation of EV induction motors," in *IEEE Transactions on Industrial Electronics*, vol. 51, no. 2, pp. 312-320, April 2004.
[10] R. U. Hague, A. Kowal, J. Ewanchuk, A. Knight and J. Salmon, "PWM control of a dual inverter drive using an open-ended winding induction motor," 2013 *IEEE 28th Annual Applied Power Electronics Conference and Exposition (APEC)*, Long Beach, CA, USA, 2013, pp. 150-156.
[11] S. Lu, K. A. Corzine and M. Ferdowsi, "A Unique Ultracapacitor Direct Integration Scheme in Multilevel Motor Drives for Large Vehicle Propulsion," in *IEEE Transactions on Vehicular Technology*, vol. 56, no. 4, pp. 1506-1515, July 2007.
[12] J. Hong, H. Lee and K. Nam, "Charging Method for the Secondary Battery in Dual-Inverter Drive Systems for Electric Vehicles," in *IEEE Transactions on Power Electronics*, vol. 30, no. 2, pp. 909-921, February 2015.
[13] G. J. Kish, C. Holmes and P. W. Lehn, "Dynamic modeling of modular multilevel DC/DC converters for HVDC systems," 2014 *IEEE 15th Workshop on Control and Modeling for Power Electronics (COMPEL)*, Santander, 2014, pp. 1-7.
[14] H. Brnklau, A. Gensior and S. Bernet, "Derivation of an equivalent submodule per arm for modular multilevel converters," 2012 *15th International Power Electronics and Motion Control Conference (EPE/PEMC)*, Novi Sad, 2012, pp. LS2a. 2-1-LS2a. 2-5.
[15] *Electric Vehicle Conductive Charging System* Part 23: DC Electric Vehicle Charging System, IEC 61851-23, 2014.
[16] Siang Fui Tie and Chee Wei Tan, "A review of energy sources and energy management system in electric vehicles," *Renewable and Sustainable Energy Reviews*, Volume 20, Pages 82-102, April 2013.
[17] Yuanzheng Han, M. Ranjram, P. W. Lehn, "A bidirectional multi-port DC-DC converter with reduced filter requirements," in 2015 *IEEE 16th Workshop on Control and Modeling for Power Electronics (COMPEL)*, vol., no., pp. 1-6, 12-15 Jul. 2015.
[18] Clark G. Hochgraf, John K. Basco, Theodore P. Bohn, Ira Bloom, Effect of ultracapacitor-modified PHEV protocol on performance degradation in lithium-ion cells, Journal of Power Sources, Volume 246, 15 Jan. 2014, Pages 965-969, ISSN 0378-7753, https://doi.org/10.1016/j.jpowsour.2012.09.038.

What is claimed is:

1. A method for operating an AC fast charger device, the method comprising:

provisioning gating signals for controlling operation of control operating characteristics of an AC/DC converter front-end circuit, a first traction inverter, and a second traction inverter that, when applied to one or more switching gates of the first traction inverter and the second traction inverter, shape an AC current flowing into the AC/DC converter front-end circuit from an AC power source and deliver power to a first energy storage device coupled to the first traction inverter and an electric motor and a second energy storage device coupled to the second traction inverter and the electric motor;

wherein the AC/DC converter front end circuit is an on-board rectifier connected across a differential connection of the first traction inverter and of the second traction inverter such that the first energy storage device and the second energy device are indirectly series connected through the first traction inverter and the second traction inverter and the motor; and wherein the gating signals regulate a direction of power between at least one of the first energy storage device and the second energy device and the power source.

2. The method of claim 1, wherein the gating signals cause interleaved switching of the one or more switching gates of the first traction inverter and the second traction inverter, the interleaved switching adapted to enable continuous conduction of the first energy storage device and the second energy storage device, the first energy storage device and the second energy storage conducting current through at least one phase of conduction in a period.

3. The method of claim 1, wherein control of the direction of power flow and the power factor is conducted using current control circuits for each parallel phase such that each inductor current will track one third of an input current reference, the input current reference in each stator winding being a scaled version of a normalized rectified AC voltage.

4. The method of claim 1, wherein each of the first traction inverter and the second traction inverter include a switching network incorporating the one or more switching gates, the switching networks controlling individual currents flowing to respective ones of the first energy storage device and the second energy storage device.

5. The method of claim 4, wherein each of the switching networks of the first traction inverter and the second traction inverter include at least six switches having a set of inner switches and a set of outer switches.

6. The method of claim 5, wherein the gating signals control the switching networks to balance power between the first energy storage device and the second energy storage device such that the voltage across the first energy storage device and the second energy storage device match an input voltage of the power source.

7. The method of claim 6, wherein the gating signals between the switching network of the first traction inverter and the switching network of the second traction inverter are phase shifted by 180 degrees.

8. The method of claim 5, wherein the set of inner switches and the set of outer switches have a same percentage of on-time in a switching period.

9. The method of claim 6, wherein the gating signals between pairs of the switches of the switching networks are phase shifted by 120 degrees.

10. The method of claim 1, wherein switches of the AC/DC converter front-end circuit are synchronized to a grid voltage of the power source.

11. The method of claim 1, wherein the electric motor is mounted in a vehicle and the electric motor is configured for dual-mode operation comprising a first mode wherein the electric motor provides the drive functionality to impart forces to move the vehicle, and a second mode wherein the electric motor provides the charging functionality when electrically coupled to the power source.

12. The method of claim 1, comprising generating control signals adapted to regulate a power factor on the grid-side and to reduce a magnitude of low frequency harmonics generated when charging a vehicle from the grid.

13. The method of claim 12, comprising improving the power factor and reducing the harmonic current components generated at AC terminals of the converter thereby reducing the requirements for or eliminating an AC-side filter.

14. The method of claim 1, wherein the power supply provides single-phase AC power.

15. The method of claim 1, wherein the power supply provides three-phase AC power.

16. The method of claim 1, wherein a net voltage across the first energy storage device and the second energy storage device is maintained by the controller circuit to always be greater than a peak voltage received from the power supply.

17. The method of claim 1, wherein the shaping of the power characteristics of the power delivered to the first energy storage device and the second energy storage device from the power source is adapted to reduce waveform distortions in power imposed on the power source.

18. The method of claim 1, wherein the shaping of the power characteristics of the power delivered to the first energy storage device and the second energy storage device from the power source shapes an inductor current reference such that it is in-phase with a rectified grid voltage when charging from a grid or inverted such that an average current is negative when sending power back to the grid.

19. An AC fast charger device adapted to provide both drive and charging functionality, the device comprising:

a first traction inverter and a first energy storage device coupled to an electric motor and to an AC power source;

a second traction inverter and a second energy storage device coupled to the electric motor and the AC power source, the first traction inverter and the second traction inverter coupled to one another across the electric motor;

an AC/DC converter front-end circuit interfacing the first traction inverter and the second traction inverter and the power source;

a controller circuit configured to control operating characteristics of the AC/DC converter front-end circuit, the first traction inverter, and the second traction inverter by provisioning gating signals that, when applied to one or more switching gates of the first traction inverter and the second traction inverter, shapes an AC current flowing into the AC/DC front-end circuit from the AC power source and delivers power to the first energy storage device and the second energy storage device; and wherein the AC/DC converter front end circuit is an on-board rectifier connected across a differential connection of the first traction inverter and of the second traction inverter such that the first energy storage device and the second energy device are indirectly series connected through the first traction inverter and the second traction inverter and the motor; and wherein the gating signals regulate a direction of power between at least one of the first energy storage device and the second energy device and the power source.

20. A non-transitory computer readable medium storing machine interpretable instruction sets, which when executed by a processor, cause the processor to perform a method for operating an AC fast charger device, the method comprising:

provisioning gating signals for controlling operation of control operating characteristics of an AC/DC converter front-end circuit, a first traction inverter, and a second traction inverter that, when applied to one or more switching gates of the first traction inverter and the second traction inverter, shape an AC current flowing into the AC/DC converter front-end circuit from an AC power source and deliver power to a first energy storage device coupled to the first traction inverter and an electric motor and a second energy storage device coupled to the second traction inverter and the electric motor;

wherein the AC/DC converter front end circuit is an on-board rectifier connected across a differential connection of the first traction inverter and of the second traction inverter such that the first energy storage device and the second energy device are indirectly series connected through the first traction inverter and the second traction inverter and the motor; and wherein the gating signals regulate a direction of power between at least one of the first energy storage device and the second energy device and the power source.

* * * * *